United States Patent
Mizuno et al.

(10) Patent No.: US 7,565,439 B2
(45) Date of Patent: Jul. 21, 2009

(54) COMMUNICATION CONTROL FOR STORAGE SYSTEM

(75) Inventors: Makio Mizuno, Sagamihara (JP); Toshihiko Murakami, Fujisawa (JP); Tetsuya Shirogane, Odawara (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 11/400,104

(22) Filed: Apr. 7, 2006

(65) Prior Publication Data

US 2007/0180169 A1    Aug. 2, 2007

(30) Foreign Application Priority Data

Jan. 27, 2006    (JP) .............................. 2006-018369

(51) Int. Cl.
*G06F 15/16*    (2006.01)
*G06F 3/00*    (2006.01)
*G06F 13/38*    (2006.01)

(52) U.S. Cl. ........................... 709/230; 710/14; 710/74

(58) Field of Classification Search .................. 710/14, 710/3; 709/230
See application file for complete search history.

(56) References Cited

U.S. PATENT DOCUMENTS

| 6,434,620 | B1 * | 8/2002 | Boucher et al. ............. 709/230 |
| 2005/0132099 | A1 * | 6/2005 | Honma ........................ 710/15 |
| 2006/0023877 | A1 * | 2/2006 | Tsuruga ....................... 380/28 |
| 2006/0155883 | A1 * | 7/2006 | Chou et al. .................... 710/3 |

FOREIGN PATENT DOCUMENTS

JP    2005-174097    6/2005

OTHER PUBLICATIONS

Braden, R., "Requirements for Internet Hosts—Communication Layers," *Internet Engineering Task Force*, Oct. 1989, pp. 1-116, Network Working Group.

* cited by examiner

*Primary Examiner*—Henry W. H. Tsai
*Assistant Examiner*—John B Roche
(74) *Attorney, Agent, or Firm*—Sughrue Mion, PLLC

(57) ABSTRACT

During iSCSI communication, according to the contents of commands issued by a host computer, the command response time is increased due to the influence of the TCP Delayed ACK. Thus, a command issued by the host computer is analyzed, the number of TCP/IP packets required for transmitting the data requested by this command is calculated, and a precedence packet is transmitted, so that no influence is experienced due to the Delayed ACK.

5 Claims, 17 Drawing Sheets

FIG. 12

APPLICABILITY TABLE 230

| HOST COMPUTER IDENTIFICATION INFORMATION | DELAYED ACK |
|---|---|
| iqn.2004-05.com.xyz:host1 | YES |
| iqn.2004-05.com.xyz:host2 | NO |
| iqn.2004-05.com.xyz:host3 | NO |

1210    1220

COMMUNICATION CONTROL FOR STORAGE SYSTEM

CROSS-REFERENCE TO RELATED APPLICATIONS

This application relates to and claims priority from Japanese Patent Application No. 2006-018369 filed on Jan. 27, 2006, the entire disclosure of which is incorporated herein by reference.

BACKGROUND OF THE INVENTION

1. Field of the Invention

The present invention relates to a control of a communication between a storage system and a host computer, particularly to a control of a response time in the communication using a particular protocol such as, for example, the iSCSI protocol.

2. Description of the Related Art iSCSI (internet SCSI) is a protocol for performing SCSI (Small Computer System Interface) communication over a TCP/IP (Transmission Control Protocol/Internet Protocol) network.

With iSCSI, transmission and reception of commands and data is performed in so called iSCSI PDUs (Protocol Data Units). A PDU is a unit of data which can be handled by this communication protocol, and corresponds, for example, to a packet in TCP/IP or to a frame in Ethernet (registered trademark). In iSCSI, for example, a read command is termed a Read Command PDU, while the data for a read command is termed a Data-In PDU. It should be understood that, over the network, an iSCSI PDU is transmitted and received in a TCP/IP packet. In other words, Read Command PDUs and Data-In PDUs and so on are actually transmitted and received as TCP/IP packets.

FIG. 13 shows the flow of read command processing according to the iSCSI protocol. In the following, the read command will simply be termed the command, and the data for the read command will simply be termed the data.

The computer transmits the command to the storage system (1300). The storage system analyzes the command which has been transmitted from the computer, and, as the result thereof, verifies that it is a read command.

The storage system reads out the data requested by the command from a predetermined location within the storage system, and transmits it to the computer (1305). At this time, the data is divided into a plurality of packets in order to perform communication over the TCP/IP network, and is transmitted in this form.

The computer transmits an acknowledgement which indicates that it has received the TCP/IP packet including the data, transmitted from the storage system (1310).

On receipt of the acknowledgement from the computer, the storage system confirms that the packet including the data has been received by the computer normally. And the storage system transmits to the computer a response showing that the processing of the command has been completed (1315).

By the way, in the TCP protocol, with the principal objective of alleviating the load on the network, a delayed acknowledgement response which allows for a deliberate delay of the transmission of the acknowledgement for the received packet, is regulated (hereinafter this method or function is termed the Delayed ACK). The Delayed ACK is stipulated that the acknowledgement should be delayed for 0.5 seconds, or until two packets are received (see 4.2.5 of RFC1122). However, in FIG. 13, when transmitting data in the storage system to the computer, according to the delayed ACK, the computer transmits an acknowledgement to the storage system a maximum of 0.5 seconds afterwards, even if the number of packets which the storage system transmits is only one packet. Since communication between the computer and the storage system cannot take place during this interval, accordingly there is the problem that the Delayed ACK invites an increase the command response time and a deterioration of the performance.

In order to solve this problem, the method has been considered of eliminating the Delayed ACK, but since, at the present, the Delayed ACK is implemented in many devices and operating systems, if the Delayed ACK is imprudently eliminated, then there is the problem that this may have a bad effect on applications on other devices and other operating systems.

Thus, as a method for avoiding this influence of the Delayed ACK, for example, the technique described in Japanese Patent Laid-Open Publication 2005-174097 has been proposed.

SUMMARY OF THE INVENTION

In this technique of Japanese Patent Laid-Open Publication 2005-174097, it is disclosed to avoid the Delayed ACK by transmitting "some kind of command" to the peripheral device, after transmitting the required command to the peripheral device having the Delayed ACK. In concrete terms, the number of commands which have been transmitted to the peripheral device is measured, and "some kind of command" is transmitted when this number of commands has reached a predetermined constant value.

However, it sometimes happens that, depending on the connection environment between the peripheral devices, the "some kind of command" may arrive at the peripheral device after the arrival of the acknowledgement which has been delayed due to the influence of the Delayed ACK, and, in this case, the problem arises that the influence of the Delayed ACK is experienced suddenly. For example the above described problem may easily occur with the TCP/IP protocol, since it is a premise that communication according to TCP/IP is of the "best effort" type.

According to one aspect of the present invention, there is provided a storage system which is connected to a host computer and which comprises a storage unit for storing data, comprising: an operation mode determination unit which determines a data processing operation mode for said storage system; and a data processing unit which performs predetermined data processing according to said operation mode, wherein said operation mode determination unit determines whether or not to transmit arbitrary information before returning data which has been requested from said host computer, based on the length of the data requested from said host computer, and on the length of data which can be transmitted to said host computer; and said data processing unit, when decided to transmit said arbitrary information, transmits said arbitrary information before returning said data requested from said host computer, and thereafter transmits said data.

In the storage system, when decided not to transmit said arbitrary information, said data processing unit may transmit said data requested from said host computer without transmitting said arbitrary information.

In the storage system, said arbitrary information may be information which is transferred on a different layer from said data transfer.

In the storage system, said arbitrary information may be information which can be recognized by the protocol which is used by said host computer in transmission with said storage system, and which does not require a check response to be transmitted for verifying that said arbitrary information has been received by said host computer.

The storage system may further comprises a command analysis unit which analyzes a command transmitted from said host computer. Said command analysis unit acquires the length of the data requested by said host computer from said command, and said operation mode determination unit determines to transmit said arbitrary information, if a remainder is generated as the result of dividing the length of the data requested by said host computer, by the unit of data length which can be transmitted by the protocol which is used in communication with said host computer.

According to another aspect of the present invention, there is provided a storage system which is connected to a host computer, and which comprises a storage unit for storing data, comprising: an identification information acquisition unit which acquires identification information for said host computer; and a table which stores identification information and a corresponding relationship of whether or not communication using arbitrary information between said host computer and said storage system can be performed. And, this storage system decides whether or not to transfer said arbitrary information, by referring to said identification information for said host computer which has been acquired by said identification information acquisition unit, and to said table.

In the storage system, said identification information acquisition unit may acquire said identification information when said host computer performs log-in.

According to a further aspect of the present invention, there is provided a storage system which is connected to a host computer, and which comprises a storage unit for storing data, comprising: an operation mode determination unit which determines a data processing operation mode for said storage system; and a data processing unit which performs predetermined data processing according to said operation mode, wherein said operation mode determination unit, before returning data which has been requested from said host computer, decides whether or not to segment said data for transmission, based on the length of the data requested from said host computer, and on the length of data which can be transmitted to said host computer; and said data processing unit, when decided to segment said data for transmission, segments and transmits said data which has been requested from said host computer.

This storage system may further comprise a command analysis unit which analyzes a command transmitted from said host computer. Said command analysis unit acquires the length of the data requested by said host computer from said command; and said operation mode determination unit determines to segment and transmit said data, if a remainder is generated as the result of dividing the length of the data requested by said host computer, by the unit of data length which can be transmitted by the protocol which is used in communication with said host computer.

According to yet another aspect of the present invention, there is provided a storage system which is connected to a host computer, and which comprises a storage unit for storing data, comprising: an identification information acquisition unit which acquires identification information for said host computer; and a table which stores identification information and a corresponding relationship of whether or not a communication method of segmenting and transmitting said data between said host computer and said storage system can be executed. And, this storage system determines whether or not to segment and transfer said data, by referring to said identification information for said host computer which has been acquired by said identification information acquisition unit, and to said table.

In the storage system, said identification information acquisition unit may acquire said identification information when said host computer performs log-in.

According to yet another aspect of the present invention, there provided a storage system which is connected to a host computer, and which comprises a storage unit for storing data, comprising: an operation mode determination unit which determines data processing operation mode for said storage system; and a data processing unit which performs predetermined data processing according to said operation mode, wherein said operation mode determination unit determines whether or not, when returning data requested by said host computer, to transmit said data by separating said data into a packet containing the header of said data and a packet containing said data, based on the length of the data requested from said host computer, and on the length of data which can be transmitted to said host computer; and said data processing unit, when determined to transmit said data by separating said data into a packet containing the header of said data and a packet containing said data, separates said data which has been requested from said host computer into a packet containing the header of said data and a packet containing said data, and transmits said packets.

This storage system may further comprise a command analysis unit which analyzes a command transmitted from said host computer. Said command analysis unit acquires the length of the data requested by said host computer from said command; and said operation mode determination unit determines to transmit said data by separating said data into a packet containing the header of said data and a packet containing said data, if a remainder is generated as the result of dividing the length of the data requested by said host computer, by the unit of data length which can be transmitted by the protocol which is used in communication with said host computer.

According to still yet another aspect of the present invention, there provided a storage system which is connected to a host computer, and which comprises a storage unit for storing data, comprising: an identification information acquisition unit which acquires identification information for said host computer; and a table which stores said identification information and a corresponding relationship of whether or not it is possible to execute a communication method of transmitting said data by separating said data into a packet containing the header of said data and a packet containing said data in communication between said host computer and said storage system. And, this storage system determines whether or not to transmit said data by separated said data into a packet containing the header of said data and a packet containing said data, by referring to said identification information for said host computer which has been acquired by said identification information acquisition unit, and to said table.

In the storage system, said identification information acquisition unit may acquire said identification information when said host computer performs log-in.

As one embodiment of the present invention, there may be provided a storage system which comprises: a host I/F control unit which comprises an interface with a host computer; a disk I/F control unit which comprises an interface with a disk; a memory which has a region in which data transmitted to and received from the host computer and data stored on the disk are temporarily stored and a region in which are stored control information within the storage system, directory information, and the like; and a switch which mutually connects together the host I/F control unit, the disk I/F control unit, and the memory, and the disk which stores data. The host I/F control unit comprises: an I/F processing unit which processes a protocol which is used in communication with the host computer; a buffer which is used as a temporary data storage region for the protocol processing by the I/F processing unit; a data transfer control unit which controls the data transfer between the host computer and the inside of the storage system; a processor which controls the I/F processing unit and the data transfer control unit; and a memory for storing programs and the like for execution by the processor. The storage system comprises: a command analysis means which acquires from a command which has been received from the host computer at least the amount of data which has been requested; a calculation means which calculates the number of times for data transmission which are required by the command from the data amount which can be transmitted at one time by the protocol; and a first determination means which determines whether or not this number of times for data transmission will experience the influence of the Delayed ACK. The first determination means has a "precedence packet mode" in which, if it has been determined that the influence of the Delayed ACK will be experienced, before transferring the initial data to the host computer, transmits a preliminary PDU which has no direct relationship with that command.

Furthermore, as an embodiment, the storage system may be provided with a "data segmentation mode" in which, if the first determination means has determined that the influence of the Delayed ACK will be experienced, the number of times for transmission of the data is adjusted so that no influence will be experienced from the Delayed ACK.

Moreover, as another embodiment, the storage system may be provided with a "data separation mode" in which, if the first determination means has determined that the influence of the Delayed ACK will be experienced, when transmitting a packet to which a header, which is control information for the data, is appended, the number of times for transmission of the data is adjusted by transmitting the data and the header as individual separate packets, so that no influence is exerted on the command by the Delayed ACK.

Yet further, as still another embodiment, the storage system may be provided with a table for managing whether or not the host computer is one with which, during communication with the storage system, the influence of the Delayed ACK will be experienced; and a second determination means which determines, by referring to that table based on the identifier of the host computer, whether or not the host computer is one which, during communication with the storage system, will experience the influence of the Delayed ACK. And, if this second determination means has determined that the host computer is one which will experience the influence of the Delayed ACK, the influence of the Delayed ACK is avoided by selecting a "precedence packet mode".

Even further, as yet another embodiment, if a decision has been made by the first determination means and the second determination means that the influence of the Delayed ACK will be experienced, the influence of the Delayed ACK may be avoided by selecting a "data segmentation mode".

Still further, as yet another embodiment, if a decision has been made by the first determination means and the second determination means that the influence of the Delayed ACK will be experienced, the influence of the Delayed ACK may be avoided by selecting a "data separation mode".

Finally, as still yet another embodiment, if a decision has been made by the first determination means and the second determination means that the influence of the Delayed ACK will not be experienced, then a "normal mode" may be selected in which data is transmitted normally.

BRIEF DESCRIPTION OF THE DRAWINGS

FIG. 12 shows an example of an applicability table 230;

DESCRIPTION OF THE PREFERRED EMBODIMENTS

In the following, embodiments of the present invention will be explained with reference to the drawings.

Embodiment 1

The first embodiment of the present invention will now be explained in the following.

Figure 1:
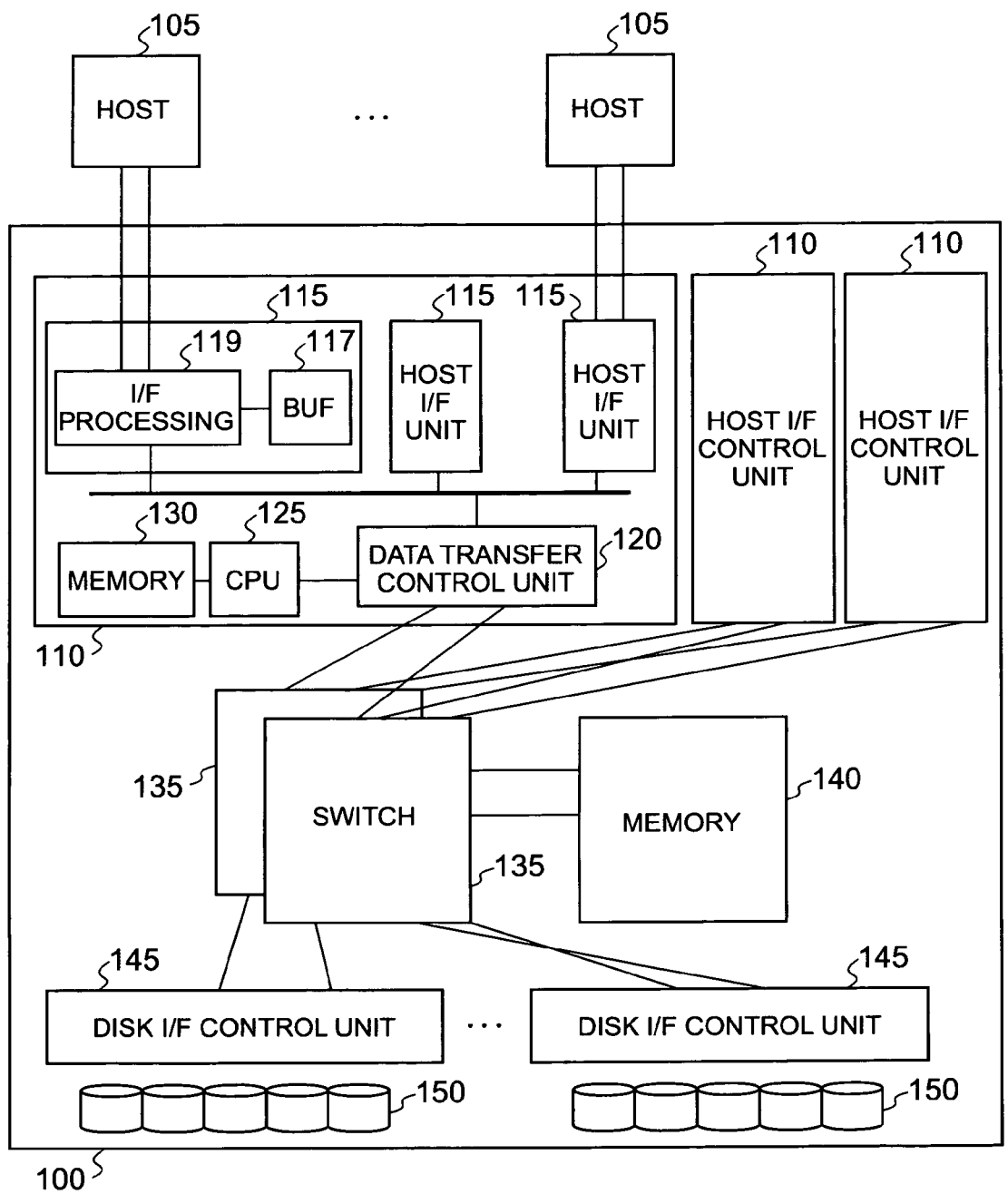
FIG. 1 is a schematic figure showing the structure of a storage system.

FIG. 1 is a schematic figure showing the structure of a storage system. The storage system 100 is connected to host computers 105. Generally, in a SAN (Storage Area Network), the storage system 100 and the host computers 105 are connected together by Fibre Channel or Ethernet (Ethernet is a registered trademark) or the like, via a network (not shown in the figures) which consists of switches and the like.

The storage system 100 comprises host I/F control units 110, switches 135, memory 140, disk I/F control units 145, and disk devices 150.

Each of the host I/F control units 110 provides interfaces with host computers 105, and comprises host I/F units 115, a data transfer control unit 120, a CPU 125, and a memory 130.

The disk I/F control units 145 provide interfaces with the disk devices 150.

The switches 135 provide mechanisms for connecting together the host I/F control units 110, the disk I/F control units 145, and the memory 140 which will be described hereinafter, and relay communications between these various structural elements 110, 145, and 140.

The memory 140 has regions for a cache memory (not shown in the figures), which is a temporary storage region for data which is transmitted to and received from the host computers 105, and for a shared memory (not shown in the figures) which stores control information and structural information within the storage system 100.

A summary of the structure of a host I/F control unit 110 will now be explained.

Each of the host I/F units 115 is a section which processes an interface with one of the host computers 105, and comprises an I/F processing unit 119 and a buffer 117.

The I/F processing unit 119 processes the protocol which is used for communication with the host computer 105. And the buffer 117 is used for temporarily storing packets which are transmitted to and received from the host computer 105, in order for the I/F processing unit 119 to perform protocol processing.

The host I/F processing unit 115 performs protocol processing of packets which have been received from the host computer 105, and determines the storage location and the length of the data in a disk device 150, a command, and the format of the data to be stored in the disk device 150. Furthermore, when transmitting data in one of the disk devices 150 or in the cache memory of the memory 140 to one of the host computers 105, packets are created according to the protocol which is used for communicating data to the host computer 105, to which the identification information of the host computer 105 and control information related to the commands and the like have been appended.

For transmission and reception of data to and from the host computers 105, the data transfer control unit 120 controls data transfer between the host I/F units 115 and the cache memory of the memory 140 and the disk devices 150.

The CPU 125 controls the host I/F units 115 and the data transfer control unit 120, and principally performs setting of parameters and fault monitoring and processing and the like for the various units. And the memory 130 is a region for storing a program to be read out and executed by the CPU 125, and data. It should be understood that the program which is stored in the memory 130 and is executed by the CPU 125 will be explained in detail with reference to FIG. 2.

Figure 2:
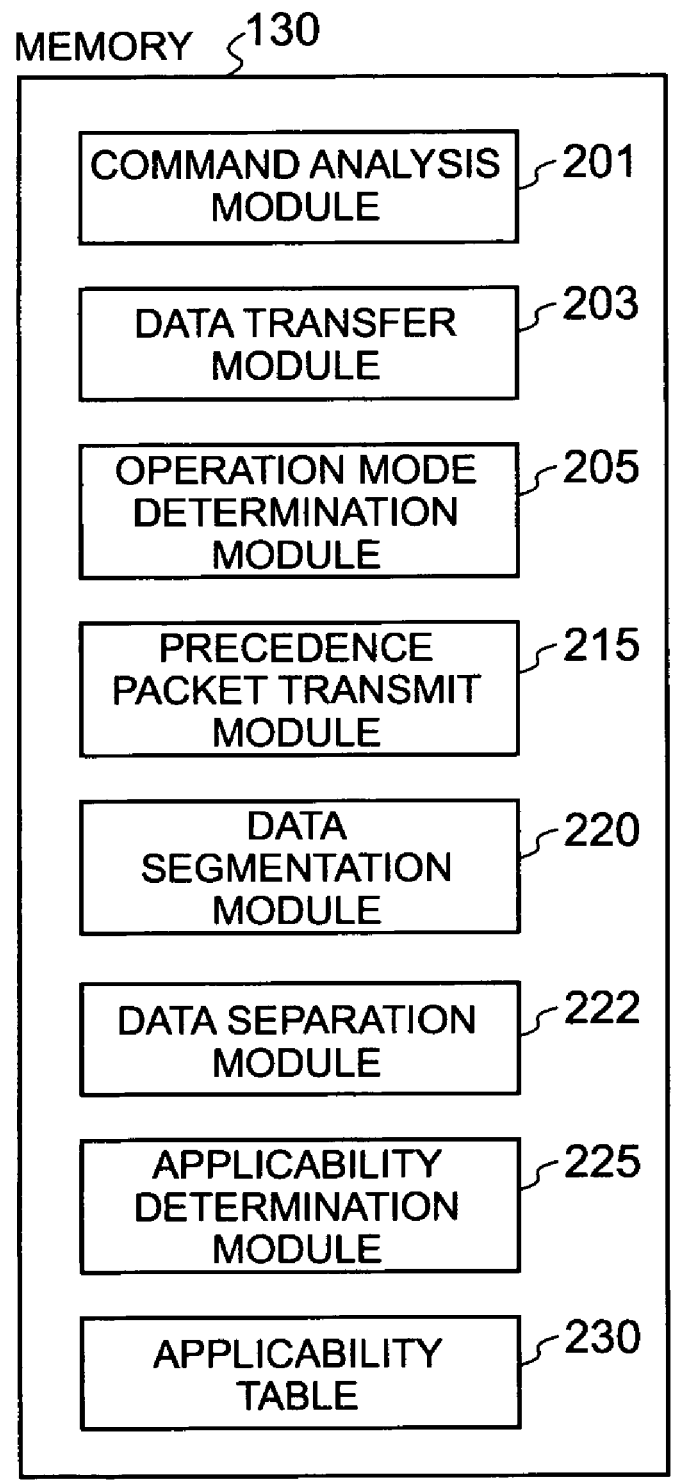
FIG. 2 shows an example of a program which is executed by a CPU for storing in a memory 130.

FIG. 2 shows an example of a program which is stored in the memory 130 and executed by the CPU 125.

In the memory 130, there are stored a command analysis module 201, a data transfer module 203, an operation mode determination module 205, a precedence packet transmit module 215, a data segmentation module 220, a data separation module 222, an applicability determination module 225, and an applicability table 230.

The command analysis module 201 has the function of analyzing the commands which have been received from the host computers 105.

The data transfer module 203 has the function of indicating the data transfer control unit 120 in order to provide the data in a disk device requested by the host computer 105 within the cache memory.

The operation mode determination module 205 has the function of determining, from the size of the data which is requested in the command transmitted from the host computer 105, whether or not it may experience any influence from the Delayed ACK. In concrete terms, it checks whether the number of packets which are required for transmitting all of the data which is requested to the host computer 105, is a multiple of the number of packets which are required for transmitting the acknowledgement by the host computer 105 without any delay. Here, if the number of packets required for transmitting all of the requested data is not a multiple of the number of packets which are required for transmission of the acknowledgement by the host computer 105 without any delay, then it may experience some influence from the Delayed ACK.

In order to avoid the above described influence, there is provided the precedence packet transmit module 215, which indicates the host I/F unit 115 to transmit a packet (hereinafter termed a "precedence packet") before actually transmitting the data. On the other hand, if the number of packets required for transmitting all of the requested data is a multiple of the number of packets which are required for the acknowledgement by the host computer 105 to be transmitted without delay, then, since no influence will be experienced from the Delayed ACK, accordingly it is not necessary for any command to be given by the precedence packet transmit module 215 to the host I/F unit 115 to transmit any precedence packet. It should be understood that the state in which a precedence packet is transmitted will be termed "precedence packet mode", while the state in which no such precedence packet is transmitted will be termed "normal mode".

Moreover, it should be understood that, provided that the precedence packet is information which can be recognized at least by the protocol which is being used for communication between the host computer and the storage system, this will be sufficient; for example, a NOP-In PDU may be used with the iSCSI which is used for the data transfer. Furthermore, it is desirable for the precedence packet to be a command of a type for which no response is anticipated from the host computer 105. Yet further, it would also be acceptable for the precedence packet to be information which is transferred on a different layer from the data transfer; for example, it may be information which can be recognized by the TCP layer. For example, it would be acceptable to transfer the precedence packet on the SCSI layer, and to transfer the Data-In-PDU on the TCP/IP layer.

Figure 3:
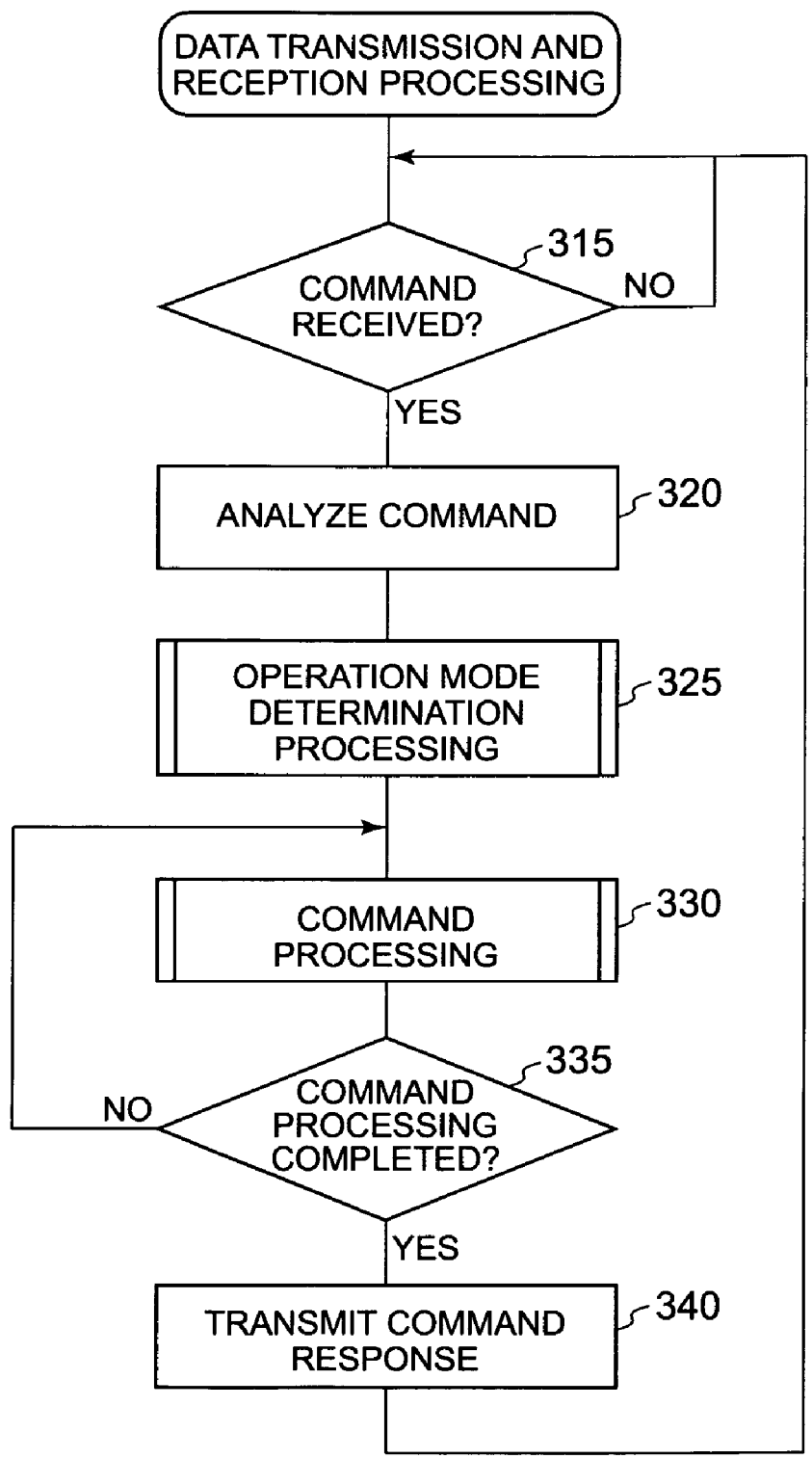
FIG. 3 shows a flow chart for data transmission and reception processing in the first embodiment.

FIG. 3 shows a flow chart for data transmission and reception processing in the first embodiment of the present invention. In the initial step 315, a CPU 125 of the storage system 100 is in the state of waiting for reception of a command from a host computer 105. And a packet which includes a command and data or the like is received from a host computer 105, and the command and data are extracted by the host I/F unit 115 by appropriate protocol processing, with the contents thereof being written into the memory 130 of the CPU 125.

Next, the CPU 125 reads out from the memory 130 the command which was written in the previous step, and the command analysis module 201 analyzes it (step 320). As the result of this command analysis by the command analysis module 201, the details of the processing requested by the host computer 105, the data storage location within the disk devices 150, the length (A) thereof, and the like are ascertained.

The operation mode is decided on (step 325) using the information about the length of the data which was ascertained in the step 320. It should be understood that this step 325 will be described in detail hereinafter.

In a step 330, the CPU 125 performs processing according to the various items of information which were ascertained in the step 325, and, according to requirements, transmits a precedence packet. It should be understood that this step 330 will be described in detail hereinafter.

And, if the processing of the step 330 has been completed, a response to the command is transmitted to the host computer 105 (step 340), and again the system waits for the receipt of a command from the host computer 105. If not, the steps 330 and 335 are repeated.

Figure 4:
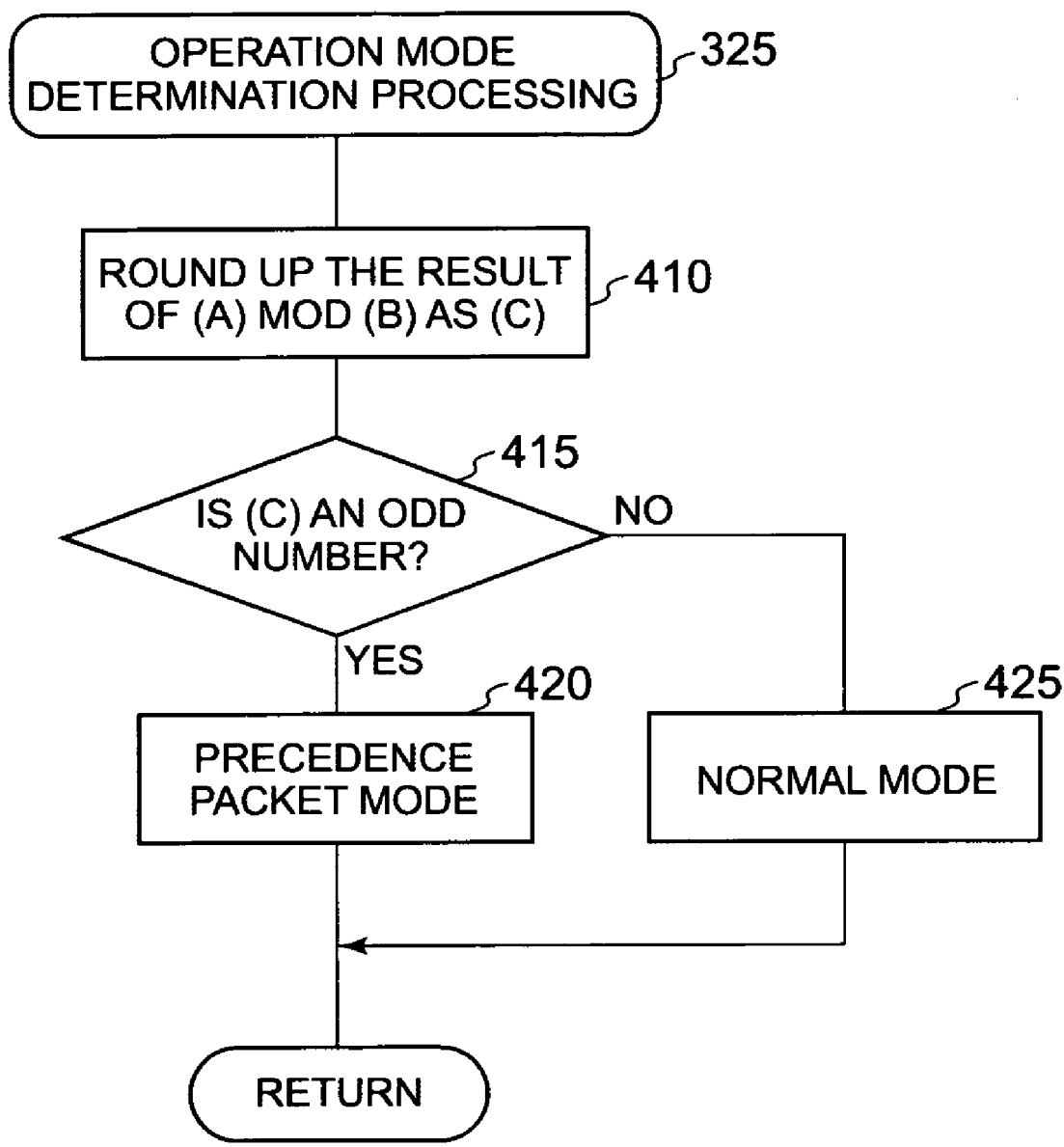
FIG. 4 shows a flow chart of operation mode determination processing 325 in the first embodiment.

FIG. 4 shows a flow chart of the operation mode decision processing step 325 of this first embodiment.

Now, the length (B) of data which can be transmitted in a single packet will be explained. In this first embodiment, it will be supposed that the connection between the host computer 105 and the storage system 100 is by Ethernet (registered trademark).

It should be understood that, generally, the length of data which can be transmitted by Ethernet in a single packet is a MTU (Maximum Transmission Unit) of 1500 bytes. However, when consideration is given to the length of the header which is actually appended as control information to the packet, the length of data which can be actually transmitted is around 1460 bytes.

In an initial step 410, the required number of packets is calculated from the length (A) of the data which is requested by the host computer 105, which was ascertained in the step 320 of FIG. 3, and the length (B) of data which can be transmitted in a single packet. In concrete terms, the quotient obtained by dividing (A) by (B) is rounded up to the next integer, and this is taken as being the number (C) of packets to be transmitted.

By the way, the Delayed ACK may delay acknowledgement until two packets are received from the other party to communication. Accordingly, it is possible to decide whether or not any influence from the Delayed ACK will be experienced by seeing (step 415) whether the immediately previously calculated quantity (C) is an odd number or not. In this embodiment the case of two packets is considered, but the present invention is not to be considered as being limited to this case. Furthermore although, since the case of two packets is being considered, it is decided whether or not (C) is an odd number, naturally the present invention should not be considered as being limited to this concept.

For example, in the case of three packets, for (C), it is decided whether or not it is a multiple of 3, and if it is not a multiple of 3, it is decided that the influence of the Delayed ACK may be experienced. The details of this will be described hereinafter. Furthermore, the CPU 125 may indicate the host I/F unit 115 to change this setting (two packets, or three packets, etc . . . ) at any timing, and not only during data communication. If, in the step 415, it is decided that (C) is an odd number, in other words that it is not a multiple of the number of packets required for the host computer 105 to transmit the acknowledgement without any delay, then, since the influence of the Delayed ACK is being experienced, the precedence packet mode in which a precedence packet is transmitted is selected (step 420).

If (C) is an even number, in other words, if it is a multiple of the number of packets which are required for transmission of the acknowledgement check by the host computer 105 without any delay, then, since the influence of the Delayed ACK is not being experienced, the normal mode is selected (step 425).

For example, if (A) is supposed to be 4096 bytes, and since (B) is 1460 bytes, in the step 410, the required number of packets (C) is calculated as being three packets. Accordingly, in the step 415, it is decided that (C) is an odd number, so that it is decided that the influence of the Delayed ACK is being experienced. And, finally, the flow of control returns to the step 330 of FIG. 3.

Figure 14:
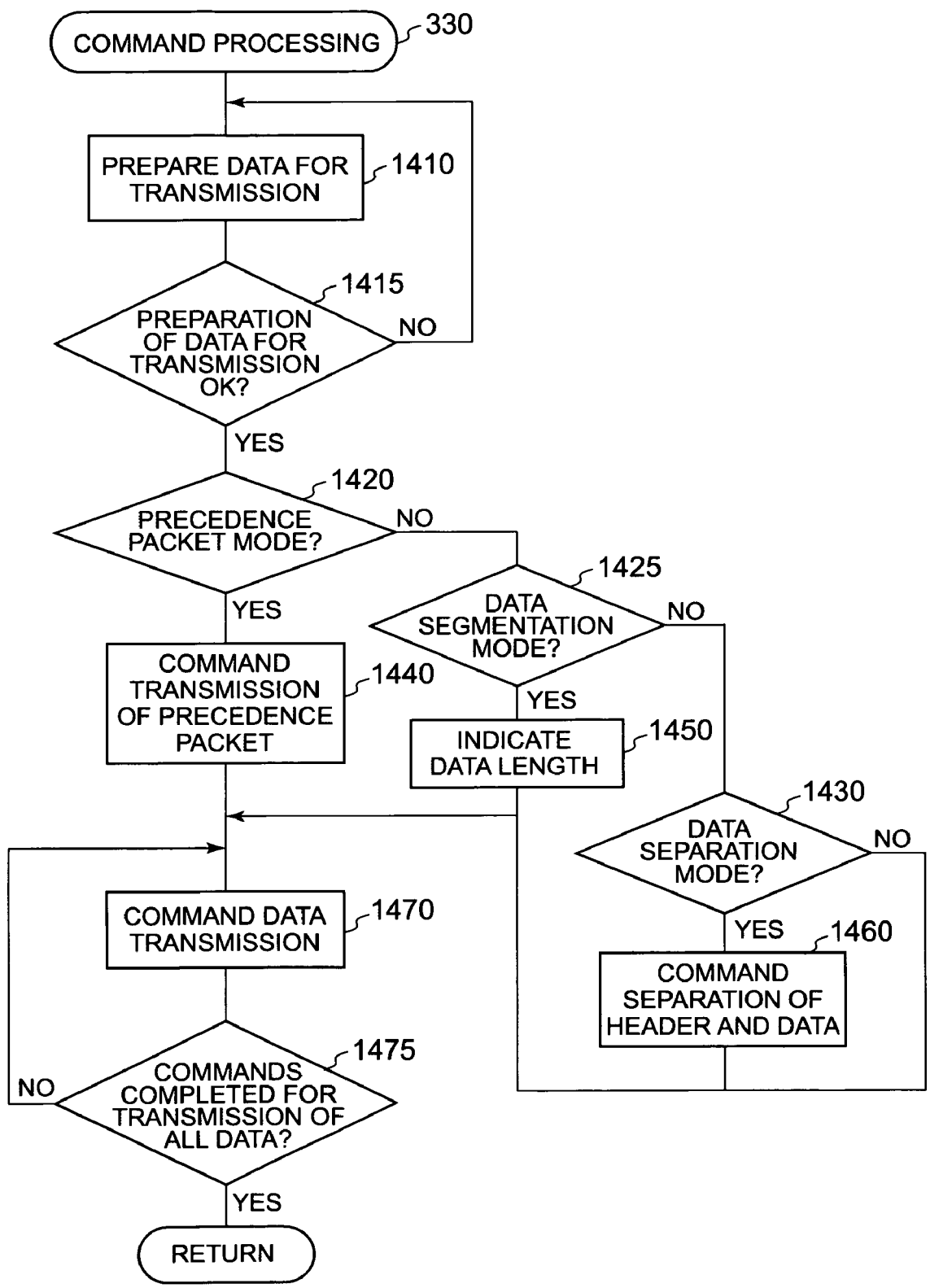
FIG. 14 shows a flow chart for command processing 330 according to the present invention.

FIG. 14 shows a flow chart of the command processing of the step 330.

In a step 1410, the data is prepared for transmission to the host computer 105. In concrete terms, the CPU 125 indicates the disk I/F control unit 145 to read out the data from the appropriate location within the appropriate one of the disk devices 150, by using information about the storage location and the length of the data obtained from the host I/F unit 115, and control information and structure information stored in the shared memory (not shown in the figures).

Next, the disk I/F control unit 145 reads out the data from the appropriate location in the appropriate one of the disk devices 150, and stores it in the cache memory (not shown in the figures). It should be understood that this processing may be omitted, if the data is already present in the cache (not shown in the figures). The CPU 125 waits (step 1415) until the preparation of the data for transmission to the host computer 105 is completed, and, when it is completed, checks (step 1420) whether or not the current operation mode is the precedence packet mode.

If the current operation mode is not the precedence packet mode, then the flow of control proceeds to the step 1425.

On the other hand, in the case of the precedence packet mode, the CPU 125 indicates the host I/F unit 115 (step 1440) to transmit a precedence packet to the host computer 105, before transmitting the data. This processing is repeated according to the length of the data, and, when indicates for transmission of all of the data have been completed, the flow of control returns to the step 335 of FIG. 3.

Figure 5:
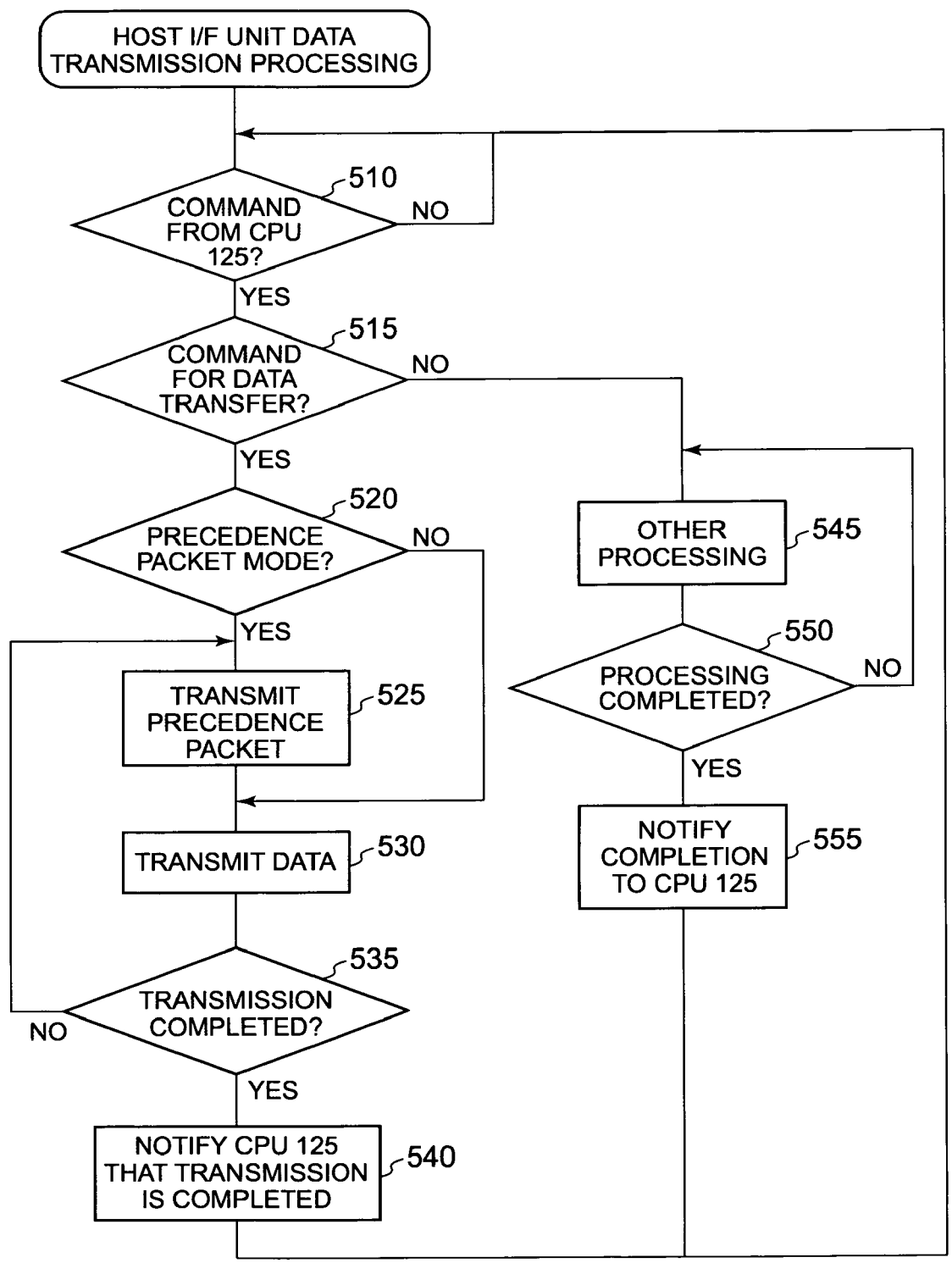
FIG. 5 shows a flow chart for data transmission processing by a host I/F unit in the first embodiment.

FIG. 5 shows a flow chart for the data transmission by the host I/F unit, in this first embodiment of the present invention.

In a step 510, the host I/F unit 115 waits for a command from the CPU 125. And, when the host I/F unit 115 receives a command from the CPU 125, it checks what type of command this is. If it is a command for data transfer to the host computer 105 (step 515), then it checks the current operation mode. And, if the current operation mode is the precedence packet mode (step 520), then the host I/F unit 115 transmits a precedence packet to the host computer 105 (step 525), and transmits the data following that packet (step 530). In concrete terms, first, the host I/F unit 115, for example, creates a NOP-In PDU for iSCSI, and creates a packet and transmits it to the host computer 105. Next, the host I/F unit 115 issues a command to the data transfer control unit 120 to transfer the data which has been read out from the cache memory to the host I/F unit 115. And the host I/F unit 115 creates a Data-In PDU from the data which has been transferred from the data transfer control unit 120, and creates a packet, and transmits it to the host computer 105.

When the data transmission to the host computer 105 has been completed (step 535), the host I/F unit 115 notifies the CPU 125 that the transmission has been completed (step 540).

It should be understood that, in the case of a command other than one for performing data transfer, the host I/F unit 115 performs the appropriate processing according to that command (step 545), repeats it until it is completed (step 550), and finally notifies the CPU 125 that it has been completed (step 555). By a command other than one for performing data transfer, there is meant, for example, processing for transmission of a command response after the data transmission to the host computer 105 has been completed.

Figure 15:
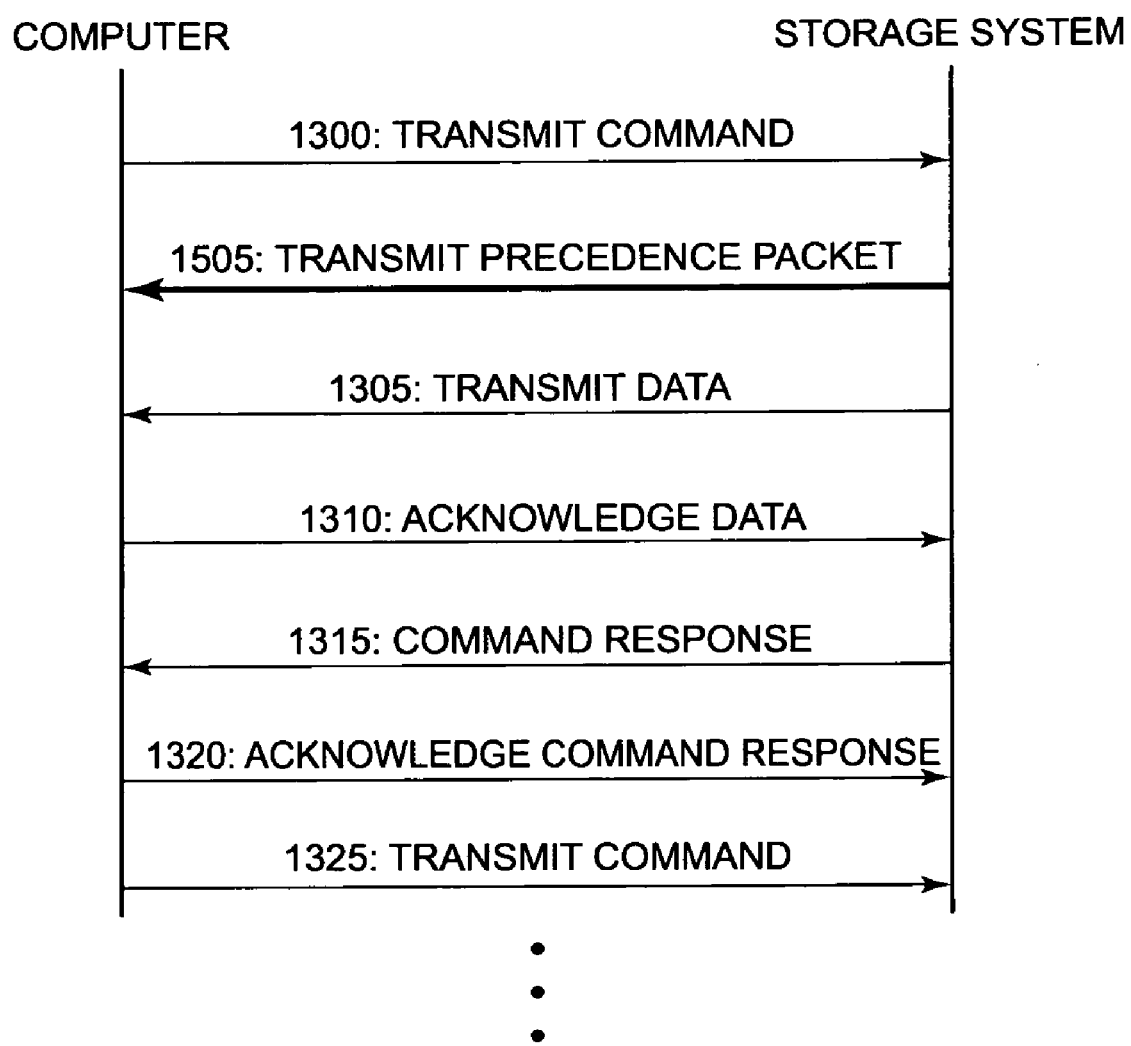
FIG. 15 shows the state of communication between a host computer 105 and a storage system 100, according to the present invention.

FIG. 15 shows the state of communication between the host computer 105 and the storage system 100 in this first embodiment of the present invention.

First, the host computer 105 transmits a command to the storage system 100 (step 1300), and the storage system 100 analyzes the command which it has received, and decides whether communication due to this command will experience the influence of the Delayed ACK. If it is decided by the storage system 100 that the influence of the Delayed ACK will be experienced, then, in order to avoid this, a precedence packet is transmitted (step 1505) as shown in FIG. 3 and FIG. 4; and, next, the data requested by the host computer 105 is transmitted (step 1305). Since the host computer 105 has received two packets (in the steps 1505 and 1305) from the storage system 100, it transmits acknowledgement for them to the storage system 100 without any delay (step 1310).

The storage system 100 receives the acknowledgement from the host computer 105, and transmits a response to the command (step 1315).

The host computer 105 transmits (step 1320) an acknowledgement for the response of the step 1315, and then transmits the next command to the storage system 100 (step 1325).

According to this first embodiment of the present invention, in order to control the transmission of a precedence packet, the storage system decides whether or not the influence of the Delayed ACK will be experienced, from the length of the data which is requested by the host computer. Furthermore, by the storage system transmitting a precedence packed for which no acknowledgement from the host computer is required before transmitting the data if the influence of the Delayed ACK will be experienced, not only is it possible to avoid the influence of the Delayed ACK in a simple manner, but also this brings about a yet further shortening of the acknowledgement response time of the host computer to data transmission, and of the command response time. Due to this, the advantages of the present invention become particularly prominent if the connection distance between the host computer and the storage system is long.

Embodiment 2

The second embodiment of the present invention will now be explained in the following.

The aspect in which this second embodiment differs from the first embodiment is that, if the operation mode determination module 205 has decided that the influence of the Delayed ACK will be experienced, the influence of the Delayed ACK is avoided according to a data segmentation mode, instead of a precedence packet mode. By a data segmentation mode is meant a mode in which, when the storage system 100 is transmitting the data requested by the host computer 105, the data is segmented in order to adjust the number of packets transmitted, so that the influence of the Delayed ACK is not experienced. It should be understood that the mode which is not this data segmentation mode is the normal mode.

Although the storage system 100 has the same structure as that shown in FIG. 1, in this second embodiment, in order to implement the data segmentation mode, a data segmentation module 220 shown in FIG. 2 is provided.

This data segmentation module 220 has the function of, if it has been decided by the operation mode determination module 205 that the influence of the Delayed ACK will be experienced, calculating the length of the data which should be transmitted in one packet so that the number of packets required for transmission of the requested data becomes a number of packets which will experience no influence due to the Delayed ACK, and indicating this to the host I/F unit 115.

Figure 6:
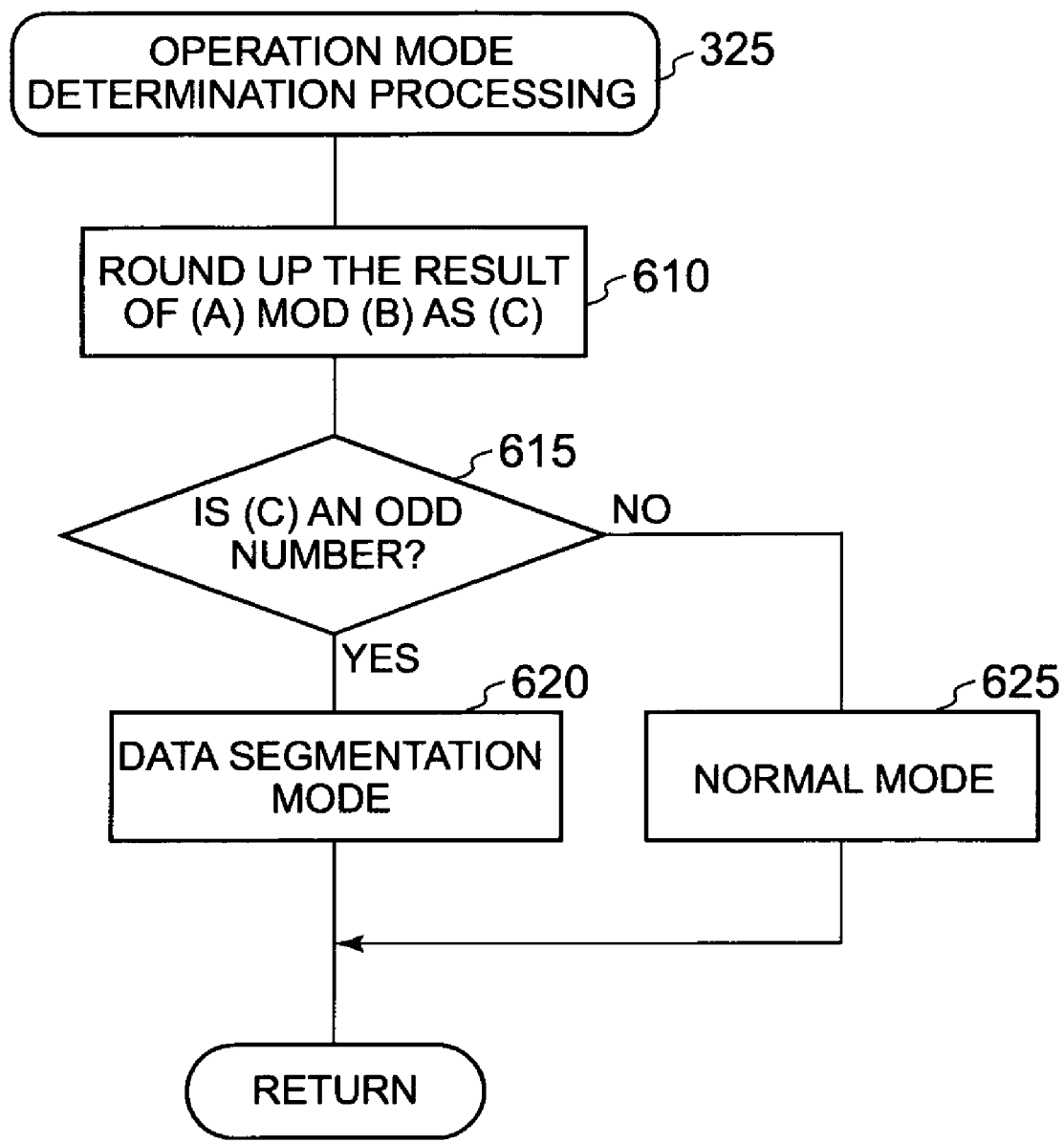
FIG. 6 shows a flow chart of operation mode determination processing in the second embodiment.

FIG. 6 shows a flow chart of the operation mode determination processing according to this second embodiment.

In steps 610 and 615, the operation mode determination module 205 calculates the number of packets required for transmitting the data to the host computer 105, and decides whether this is an odd number or not. Here, in this embodiment, this decision as to whether the number of packets is an odd number or not is performed in the same manner as in the first embodiment, and the Delayed ACK is set in order to make it possible to delay acknowledgement until two packets are received from the opposite party to communication. It should be understood that, in this embodiment as well, the present invention should not be considered as being limited to the case of two packets. For example, in the case of three packets, a decision is made as to whether or not it is a multiple of 3. The details of this will be described hereinafter. If the number of packets is an odd number, the data segmentation mode is selected (step 620).

For example, if the data to be transmitted to the host computer 105 is 4096 bytes, and the data length which can be transmitted in one packet is 1460 bytes, then the required number of packets is three packets. Since, in this case, the influence of the Delayed ACK will be experienced, accordingly, for example, although basically it is possible to transmit 1460 bytes in a single packet, that single packet is segmented into two packets by halving the data length. Due to this, the number of packets required becomes six packets, so that it is possible to avoid the influence of the Delayed ACK.

If the number of packets is not an odd number, then the normal mode is selected (step 625).

And then the flow of control returns to the step 330 of FIG. 3.

Next, the command processing in this second embodiment will be explained with reference to FIG. 14; the flow is as follows.

When preparations for data transmission to the host computer 105 have been completed by the data transfer module 203 (in steps 1410 and 1415), the CPU 125 checks the operation mode.

Since in this embodiment the data segmentation mode is used, the flow of control proceeds to the step 1425 without any consideration being given to processing in the precedence packet mode (YES in the step 1420, and in the step 1440). And the CPU 125 indicates the data length for transmitting data to the host I/F unit 115 (step 1450), and indicates data transmission (step 1470). The CPU 125 repeats the step 1470 until commands for the transmission of all of the data have been completed, and then, when this has been completed (in the step 1475) the flow of control returns to the step 335 of FIG. 3.

Figure 7:
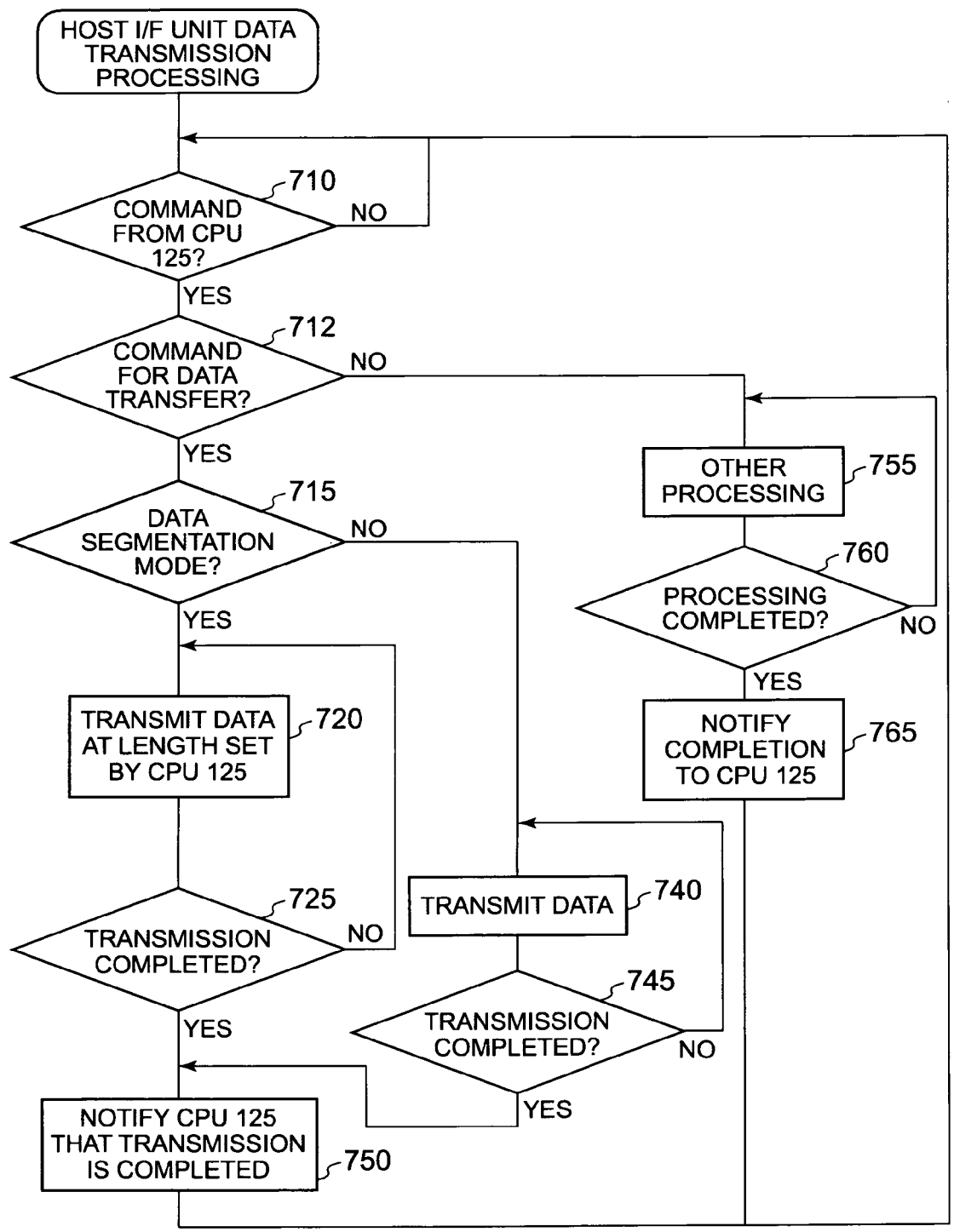
FIG. 7 shows a flow chart for data transmission processing by a host I/F unit in the second embodiment.

FIG. 7 shows a flow chart for the data transmission processing by the host I/F unit 115 in this second embodiment.

In a step 710, the system waits for a command from the CPU 125. When a command is received from the CPU 125, the current operation mode is checked (step 715). If the current operation mode is the data segmentation mode, then the transmission to the host computer 105 is performed at a data length which is set in advance from the CPU 125 (step 720), and this step 720 is repeated (step 725) until all of the data has been transmitted. Finally, when the data transmission has been completed, the host I/F unit 115 issues a notification to the host computer 105 (step 750).

On the other hand, if it is determined that the current operation mode is not the data segmentation mode in the step 715, in other words if it is the normal mode, then the data is transmitted to the host computer 105 at a normal data length (step 740). And the step 740 is repeated until the host I/F unit 115 has finished transmitting all of the data to the host computer 105. Finally, when the host I/F unit 115 has finished transmitting all of the data, it transmits a notification of this completion to the host computer 105 (in the step 750).

It should be understood that, in the case of a command other than one for performing data transfer, the host I/F unit 115 performs the appropriate processing according to that command (step 755), repeats it until it is completed (step 760), and finally notifies the CPU 125 that it has been completed (step 765). By a command other than one for performing data transfer, there is meant, for example, processing for transmission of a command response after the data transmission to the host computer 105 has been completed.

It should be understood that, although the flow of communication between the host computer 105 and the storage system 100 shown in FIG. 15 differs from that in the first embodiment, in that "transmit precedence packet" (the step 1505) has been replaced by "transmit data", in other aspects, it is the same.

According to this second embodiment, the storage system decides whether or not the influence of the Delayed ACK will be experienced from the length of the data requested by the host computer, and furthermore, since communication such as shown in FIG. 15 becomes possible by segmenting the data which is transmitted if the influence of the Delayed ACK will be experienced, accordingly it is possible to shorten the command response time without being influenced by a connection environment or the like between a host computer and a storage system.

Embodiment 3

The third embodiment of the present invention will now be explained in the following.

The aspect, in which this third embodiment differs from the second embodiment, is that, if the operation mode determination module 205 has decided that the influence of the Delayed ACK will be experienced, the influence of the Delayed ACK is avoided using a data separation mode, instead of a data segmentation mode. The data separation mode is a mode in which, when the storage system 100 is transmitting the data requested by the host computer 105, the header which is appended to the data, and the data itself, are transmitted as separate individual packets. Not only this data separation mode, but the normal mode is provided also. Although the storage system 100 has the same structure as that shown in FIG. 1, in this third embodiment, in order to implement the data separation mode, a data separation module 222 shown in FIG. 2 is provided.

Figure 8:
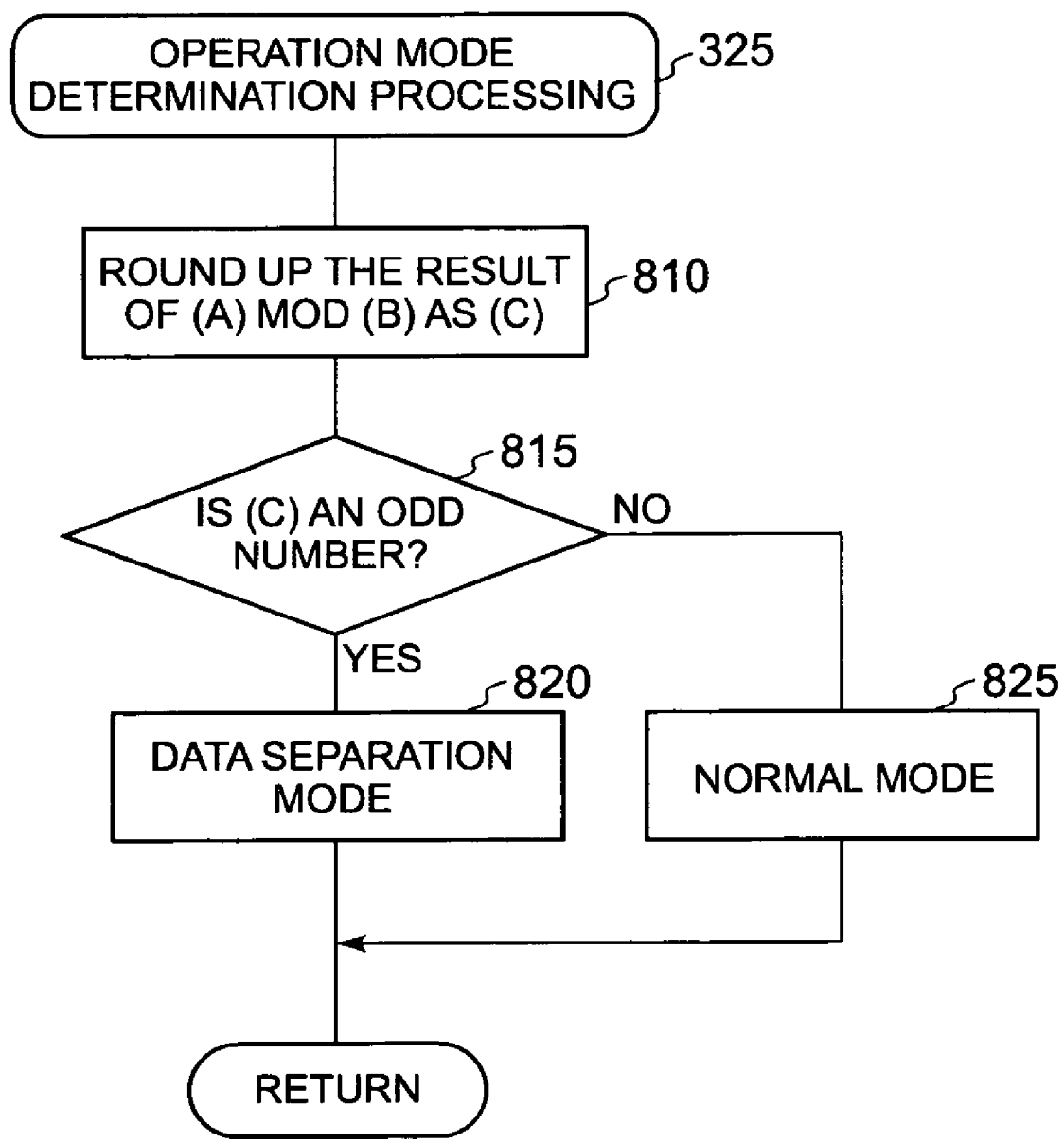
FIG. 8 shows a flow chart of operation mode determination processing in the third embodiment.

FIG. 8 shows a flow chart of the operation mode determination processing according to this third embodiment.

In steps 810 and 815, the operation mode determination module 205 calculates the number of packets required for transmitting the data to the host computer 105, and decides if this is an odd number or not. Here, in this embodiment, this decision as to whether the number of packets is an odd number or not is performed in the same manner as in the first embodiment, and the Delayed ACK is set in order to make it possible to delay acknowledgement until two packets are received from the opposite party to communication. It should be understood that, in this embodiment as well, the present invention should not be considered as being limited to the case of two packets. For example, in the case of three packets, a decision is made as to whether or not it is a multiple of 3. The details of this will be described hereinafter.

If the number of packets is an odd number, the data separation mode is selected (step 820).

For example, if the data to be transmitted to the host computer 105 is 4096 bytes, and the data length which can be transmitted in one packet is 1460 bytes, then the required number of packets is three packets. Since, in this case, the influence of the Delayed ACK will be experienced, accordingly, the header which is appended to the data to be transmitted is separated from the data and is transmitted as a separate packet. The header is included in the packet which includes the data to be initially transmitted. In other words, the initial single packet to be transmitted to the host computer 105 includes the header and data. Accordingly, by transmitting this header and data as individual separate packets, the number of packet required becomes four packets, so that it is possible to avoid the influence of the Delayed ACK.

If the number of packets is not an odd number, then the normal mode is selected (step 825).

And then the flow of control returns to the step 330 of FIG. 3.

Next, the command processing in this third embodiment will be explained with reference to FIG. 14; the flow is as follows.

When preparations for data transmission to the host computer 105 have been completed (in the steps 1410 and 1415), the CPU 125 checks the operation mode.

Since in this embodiment the data separation mode is used, the flow of control proceeds to the step 1430 without any consideration being given to processing in the precedence packet mode or in the data segmentation mode (YES in the step 1420, in the step 1440, 1425, and YES in the step 1450). And, for the packets which are to be transmitted to the host computer 105, the CPU 125 commands (step 1460) the host I/F unit 115 to transmit the packet which includes the header and the data as separate individual packets, and then commands data transmission (in the step 1470). The CPU 125 repeats the step 1470 until commands for the transmission of all of the data have been completed, and then, when this has been completed (in the step 1475) the flow of control returns to the step 335 of FIG. 3.

Figure 9:
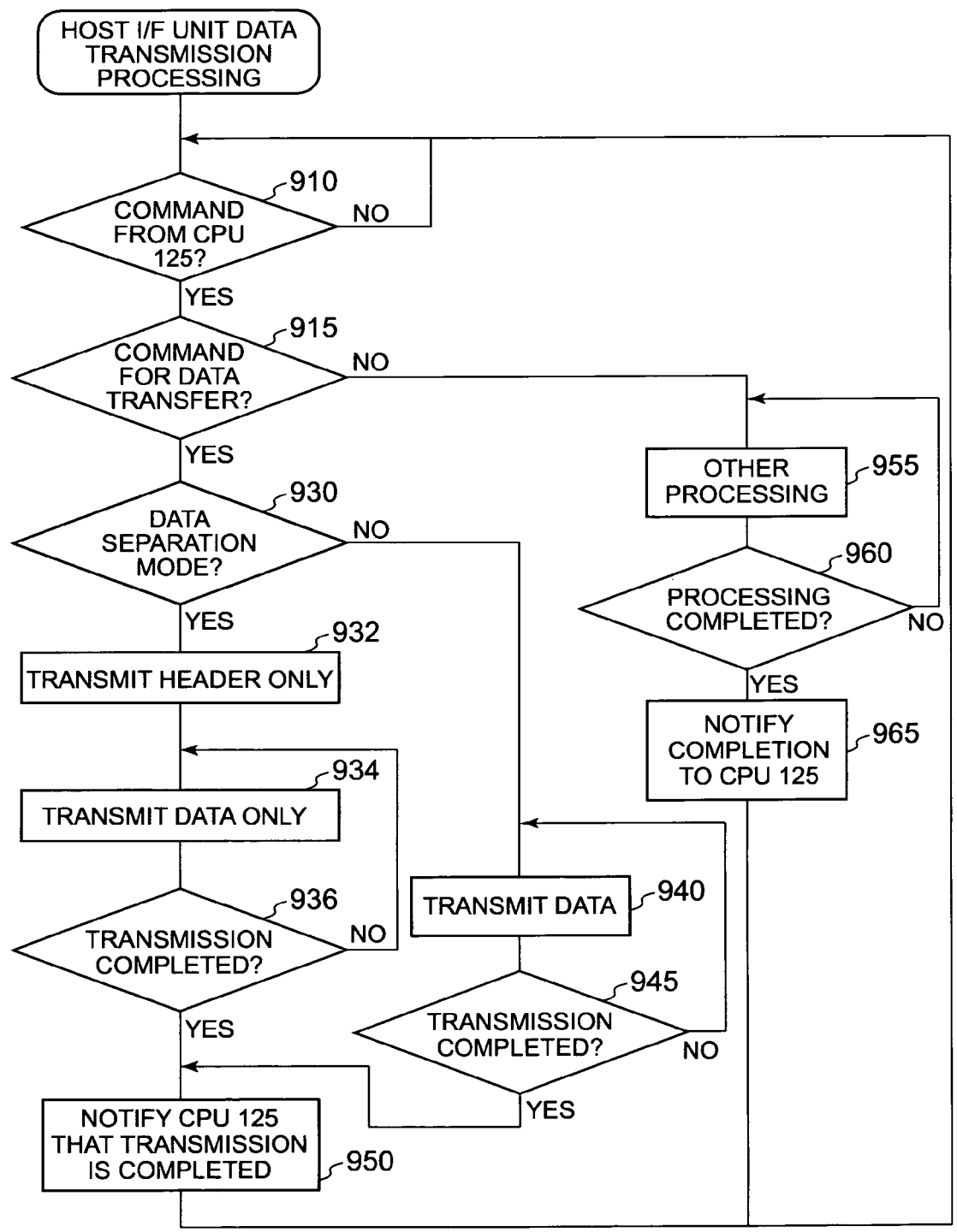
FIG. 9 shows a flow chart for data transmission processing by a host I/F unit in the third embodiment.

FIG. 9 shows a flow chart for the data transmission processing by the host I/F unit 115 in this third embodiment.

In a step 910, the system waits for a command from the CPU 125. When a command is received from the CPU 125, the current operation mode is checked (step 915). If the current operation mode is the data separation mode, then, first, the host I/F unit 115 transmits a packet including the header to the host computer 105 (step 932). In concrete terms, the host I/F unit 115 generates a packet which includes a Data-In PDU header, and transmits it to the host computer 105. Next, the host I/F unit 115 starts transmission of the data to the host computer 105 (step 934), and repeats this step 934 until all of the data has been transmitted. Finally, when the transmission of data to the host computer 105 has been completed (step 936), the host I/F unit 115 issues a notification of this completion to the CPU 125 (step 950).

On the other hand, if in the step 915 it is determined that the current operation mode is not the data separation mode, in other words if it is the normal mode, then the data is transmitted to the host computer 105 normally, without separating the header from the data (step 940). And the step 940 is repeated until the host I/F unit 115 has completed transmitting all of the data to the host computer 105. Finally, when the host I/F unit 115 has finished transmitting all of the data (step 945), it transmits a notification of this completion to the host computer 105 (in the step 950).

It should be understood that, in the case of a command other than one for performing data transfer, the host I/F unit 115 performs the appropriate processing according to that command (step 955), repeats it until it is completed (step 960), and finally notifies the CPU 125 that it has been completed (step 965).

It should be understood that, although the flow of communication between the host computer 105 and the storage system 100 shown in FIG. 15 differs from that in the first embodiment, only in that "transmit precedence packet" (the step 1505) has been replaced by "transmit header", in other aspects, it is the same.

According to this third embodiment, the storage system decides whether or not the influence of the Delayed ACK will be experienced from the length of the data requested by the host computer, and furthermore, since, if the influence of the Delayed ACK will be experienced, communication such as shown in FIG. 15 becomes possible by separating the header and the data and transmitting them as separate individual packets, accordingly it is possible to shorten the command response time without being influenced by a connection environment or the like between a host computer and a storage system.

Embodiment 4

The fourth embodiment of the present invention will now be explained in the following.

The way in which this fourth embodiment differs from the previously described embodiments, is the timing of the operation mode determination processing. In concrete terms, this difference is that, in the embodiments previously described, the operation mode determination processing was performed after reception of a command from the host computer, but, in this fourth embodiment, the operation mode determination processing is performed before this command is received.

With iSCSI, the initiator (in the present invention, this corresponds to the host computer) performs a log-in in order to perform communication with the target (in the present invention, this corresponds to the storage system). At this time, the information which is exchanged consists of identification information for the initiator and the target, and communication parameters and the like. In this fourth embodiment attention is paid, among the information which is exchanged during this log-in, to the identification information of the initiator, in other words of the host computer. In other words, the Delayed ACK applicability determination is performed according to the identification information for the host computer. In order to implement this, in the memory 130 shown in FIG. 2, there are newly stored an applicability determination module 225 and an applicability table 230.

This applicable determination module 225 has the function of deciding, according to the identification information for the host computer which is communicating with this storage system, whether or not this communication will be subject to the influence of the Delayed ACK. Such identification information, for example, may be the iSCSI name in iSCSI, the port number in TCP, the IP address in IP, or the like, or indeed any type of information which can uniquely identify the host computer, or an application on the host computer.

Furthermore, attention is paid in advance to the characteristics of the communication with the host computer. For example, with a host computer on which a management application such as state monitoring of the storage system or the like is being executed, commands for which the requested data length is comparatively short are executed. In communication with this type of host computer, there is a possibility that the influence of the Delayed ACK will be experienced. The identification information for this type of host computer is registered in the applicability table 230 which will be described hereinafter, and is able, by referring to this table, the applicability determination module 225 is able to investigate whether or not there will be an influence from the Delayed ACK.

FIG. 12 shows this applicability table 230. This applicability table 230 is a table which is referred to by the applicability determination module 225. And this applicability table 230 includes, at least, a host computer identification information field 1210 and the Delayed ACK field 1220. The host computer identification information field 1210 is a field in which is stored information such as, for example, the iSCSI name in iSCSI, the port number in TCP, the IP address in IP, or the like. In FIG. 12, by way of example, the iSCSI names "iqn.2004-05.com.xyz:host1", "iqn.2004-05.com.xyz:host2", and "iqn.2004-05.com.xyz:host3" are stored.

The Delayed ACK field 1220 is a field which shows whether or not, in communication with this host computer, the influence of the Delayed ACK will be experienced. In FIG. 12, by way of example, "YES" is shown for the influence of the Delayed ACK on communication with the host whose identification information is "iqn.2004-05.com.xyz:host1"; "NO" is shown for the influence of the Delayed ACK on communication with the host whose identification information is "iqn.2004-05.com.xyz:host2"; and "NO" is shown for the influence of the Delayed ACK on communication with the host whose identification information is "iqn.2004-05.com.xyz:host3". Delayed ACK applicability determination is performed according to this host computer identification information.

Figure 10:
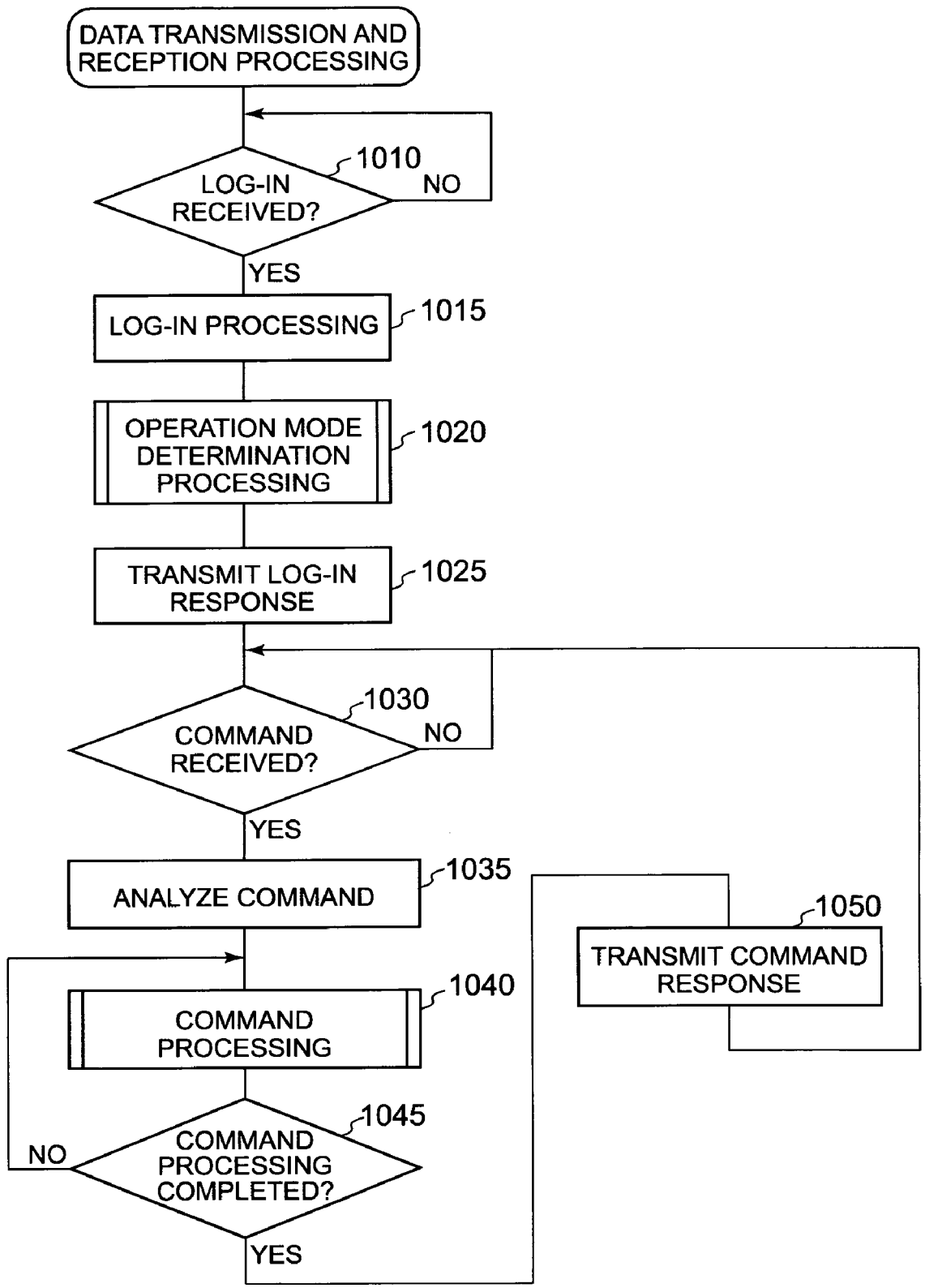
FIG. 10 shows a flow chart of data transmission and reception processing in the fourth embodiment.

FIG. 10 shows a flow chart for data transmission and reception processing in this fourth embodiment.

In a step 1010, the system waits until a log-in is received from the host computer 105. When a log-in is received from the host computer 105, log-in processing is performed (step 1015). By this log-in processing is meant authentication of the host computer 105 by the host I/F unit 115, determination of transfer parameters for communication with the host computer 105, allocation of a storage region within a disk device 150 by the CPU 125, and so on.

Next, the CPU 125 decides on the operation mode (step 1020). The details of this operation mode determination processing will be described hereinafter. The host I/F unit 115 transmits a log-in response to the host computer 105 (step 1025) based on the results of this log-in processing and operation mode determination processing. In the next step 1030, the system waits to receive a command from the host computer which has logged in. In this step 1030, the same processing is performed as in the step 315 of FIG. 3.

When a packet is received from the host computer which includes a command and data, this command and data and the like are written into the memory 130 by the host I/F unit 115, and the CPU 125 analyzes this command which has thus been written in the memory 130 (step 1035). In this step 1035, the same processing is performed as in the step 320 of FIG. 3. Thenceforward, command processing is performed according to the operation mode which was set by the step 1020 (step 1040), and this step 1040 is repeated until the command processing is completed. When the command processing is completed (step 1045), the CPU 125 commands the host I/F unit 115 to transmit a command response to the host computer (step 1050), and starts to wait for the receipt of a command.

Figure 11:
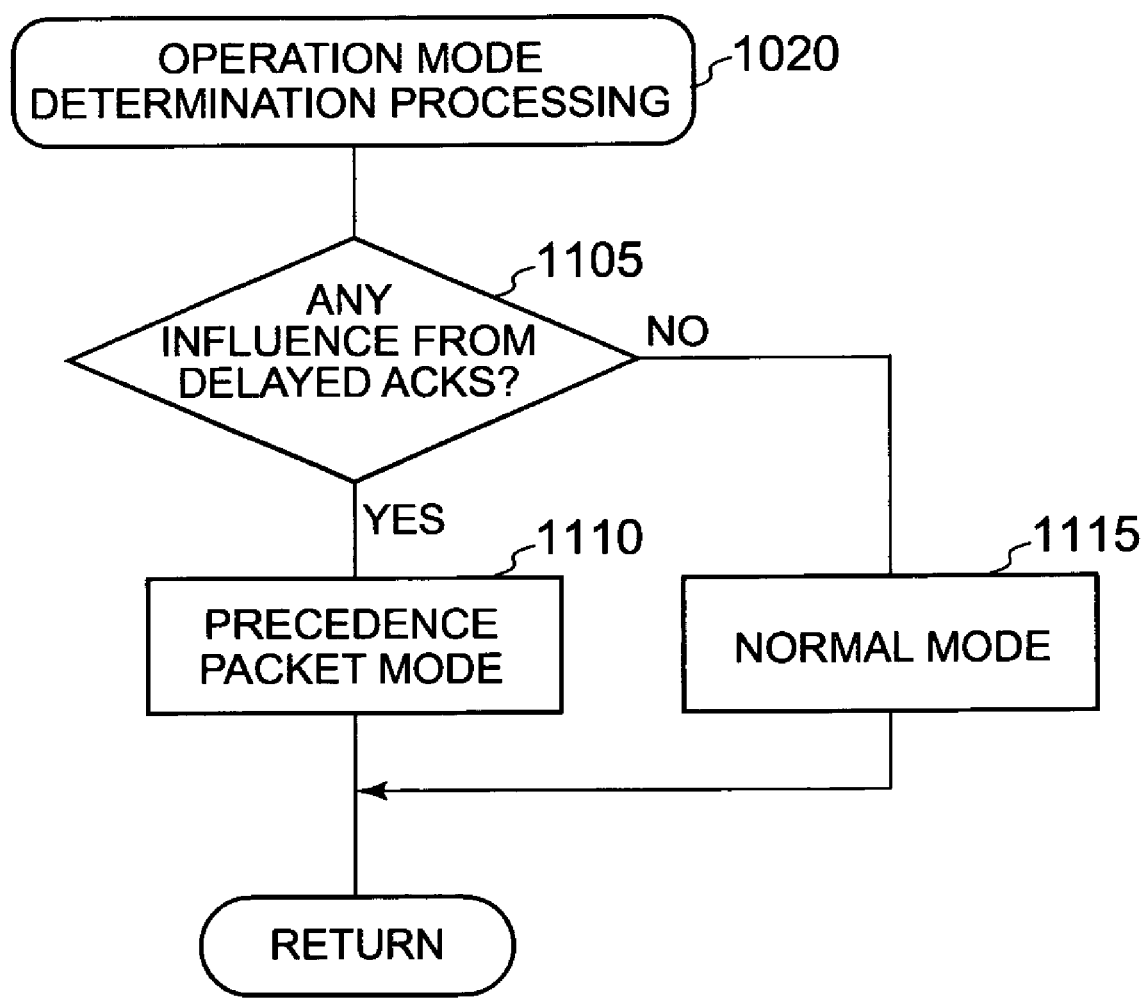
FIG. 11 shows a flow chart of operation mode determination processing in the fourth embodiment.
Figure 13:
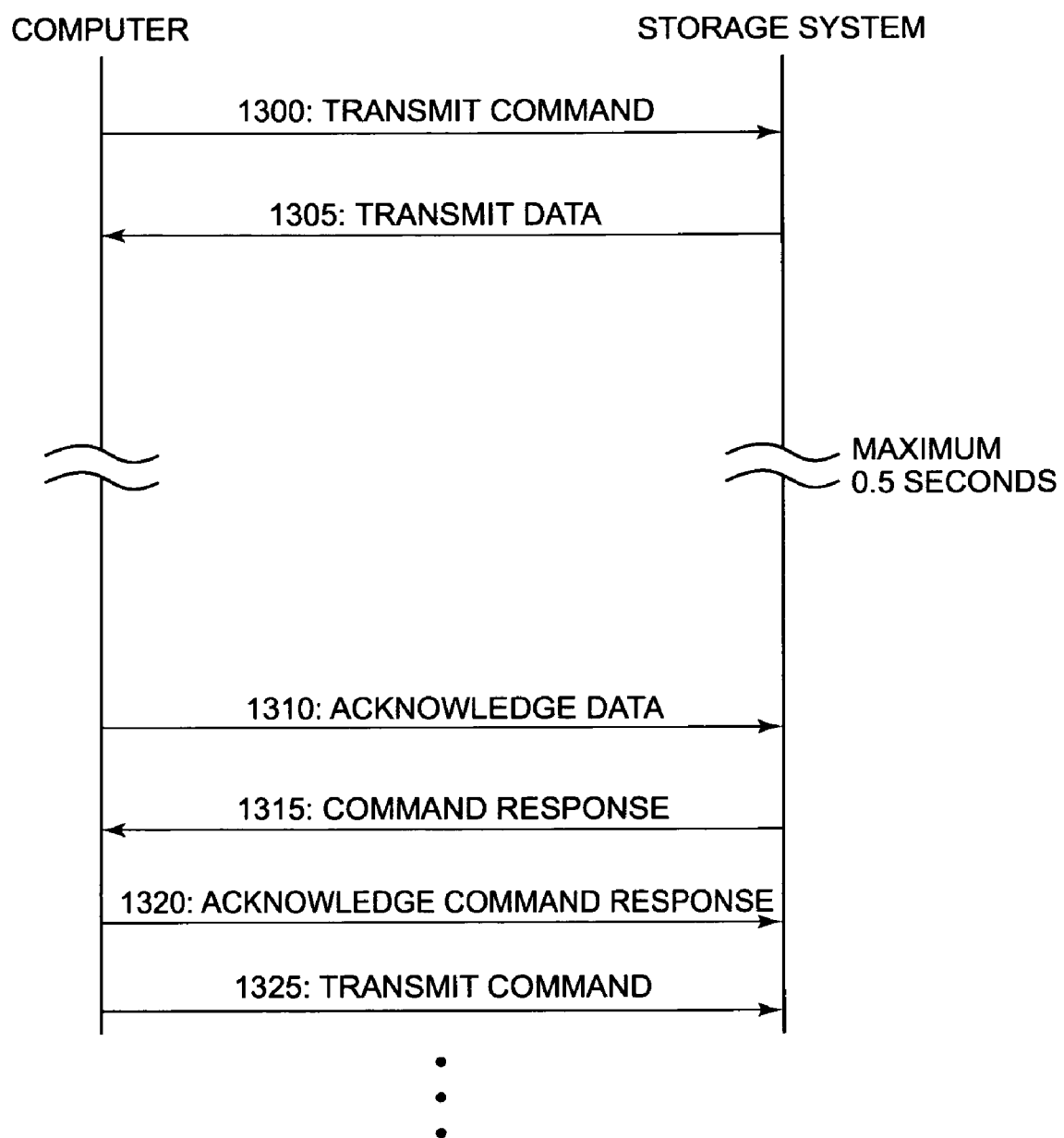
FIG. 13 shows the flow of read command processing according to the iSCSI protocol.

FIG. 11 shows a flow chart for the operation mode determination processing in this fourth embodiment. It should be understood that although, in this fourth embodiment, the storage system 100 is provided with a precedence packet mode as an operation mode, it would also be possible to select a data segmentation mode or a data separation mode appropriately, as in the fifth embodiment or the sixth embodiment described hereinafter.

In the initial step 1105, the CPU 125 decides whether or not the host computer which has requested to log-in is a communication partner which is subject to the influence of the Delayed ACK. In order to perform this determination, the CPU 125 refers to the applicability table 230. If the CPU 125 has decided that it is necessary to transmit a precedence packet, in other words that this host computer is one which is subject to the influence of the Delayed ACK, then the precedence mode is selected (step 1110). For example, in the step 1105, the CPU 125 refers to the applicability table 230, and if the identification information of the host computer which has requested to log-in is "iqn.2004-05.com.xyz:host1", then the precedence packet mode is selected, since this host computer is one which is subject to the influence of the Delayed ACK.

If the CPU 125 has decided that it is not necessary to transmit a precedence packet, in other words that this host computer is not one which is subject to the influence of the Delayed ACK, then the normal mode is selected (step 1115). For example, in the step 1105, the CPU 125 refers to the applicability table 230, and if the identification information of the host computer which has requested to log-in is "iqn.2004-05.com.xyz:host2", then the normal packet mode is selected, since this host computer is one which is not subject to the influence of the Delayed ACK.

And then the flow of control proceeds to the step 1025 of FIG. 10.

During the command processing in the precedence packet mode and in the normal mode, the same processing may be performed as shown in FIG. 14 for the case of the first embodiment.

According to this fourth embodiment, the storage system decides whether or not the influence of the Delayed ACK will be experienced, based on the identification information for the host computer; and furthermore by, before transmitting the data, transmitting a preceding packet which has no direct relationship with that command if the influence of the Delayed ACK will be experienced, it is possible to shorten the command response time without being influenced by connection environment between a host computer and a storage system and so on.

Embodiment 5

The fifth embodiment of the present invention will now be explained in the following.

The aspect, in which this fifth embodiment differs from the fourth embodiment, is that a data segmentation mode is provided as an operation mode.

Figure 16:
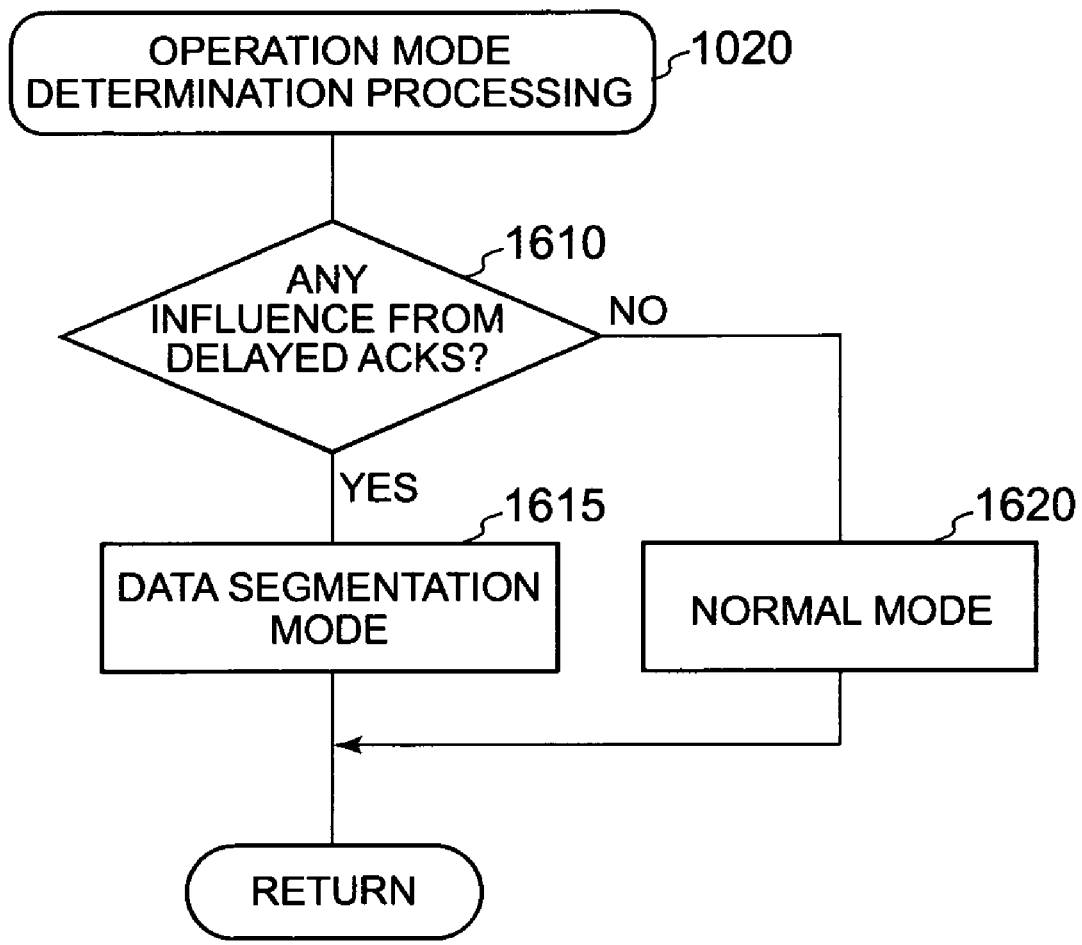
FIG. 16 shows a flow chart of operation mode determination processing in the fifth embodiment.

FIG. 16 shows a flowchart for operation mode determination processing in this fifth embodiment.

In an initial step 1610, the CPU 125 decides whether or not the host computer which has requested to log-in is a communication partner which is subject to the influence of the Delayed ACK. In order to perform this decision, the CPU 125 refers to the applicability table 230. If the CPU 125 has decided that it is necessary to perform data segmentation, in other words that this host computer is one which is subject to the influence of the Delayed ACK, and then the data segmentation mode is selected (step 1615). On the other hand, if the CPU 125 has decided that data segmentation is not required, in other words that this host computer is not one which is subject to the influence of the Delayed ACK, and then the normal mode is selected (step 1620).

In concrete terms, if the identification information of the host computer which has requested to log-in is "iqn.2004-05.com.xyz:host1", then the segmentation mode is selected, since this host computer is one which is subject to the influence of the Delayed ACK. On the other hand, if the identification information of the host computer which has requested to log-in is "iqn.2004-05.com.xyz:host2", then the normal mode is selected, since this host computer is one which is not subject to the influence of the Delayed ACK. During the command processing in the data segmentation mode and in the normal mode, the same processing may be performed as shown in FIG. 14 for the case of the first embodiment. And then the flow of control proceeds to the step 1025 of FIG. 10.

According to this fifth embodiment, the storage system decides whether or not the influence of the Delayed ACK will be experienced, based on the identification information for the host computer; and furthermore, by segmenting the data which is to be transmitted if the influence of the Delayed ACK will be experienced, since it becomes possible to perform communication as shown in FIG. 15, it is possible to shorten the command response time without being influenced by connection environment between a host computer and a storage system and so on.

Embodiment 6

The sixth embodiment of the present invention will now be explained in the following.

The aspect, in which this sixth embodiment differs from the fourth and the fifth embodiments, is that a data separation mode is provided as an operation mode.

Figure 17:
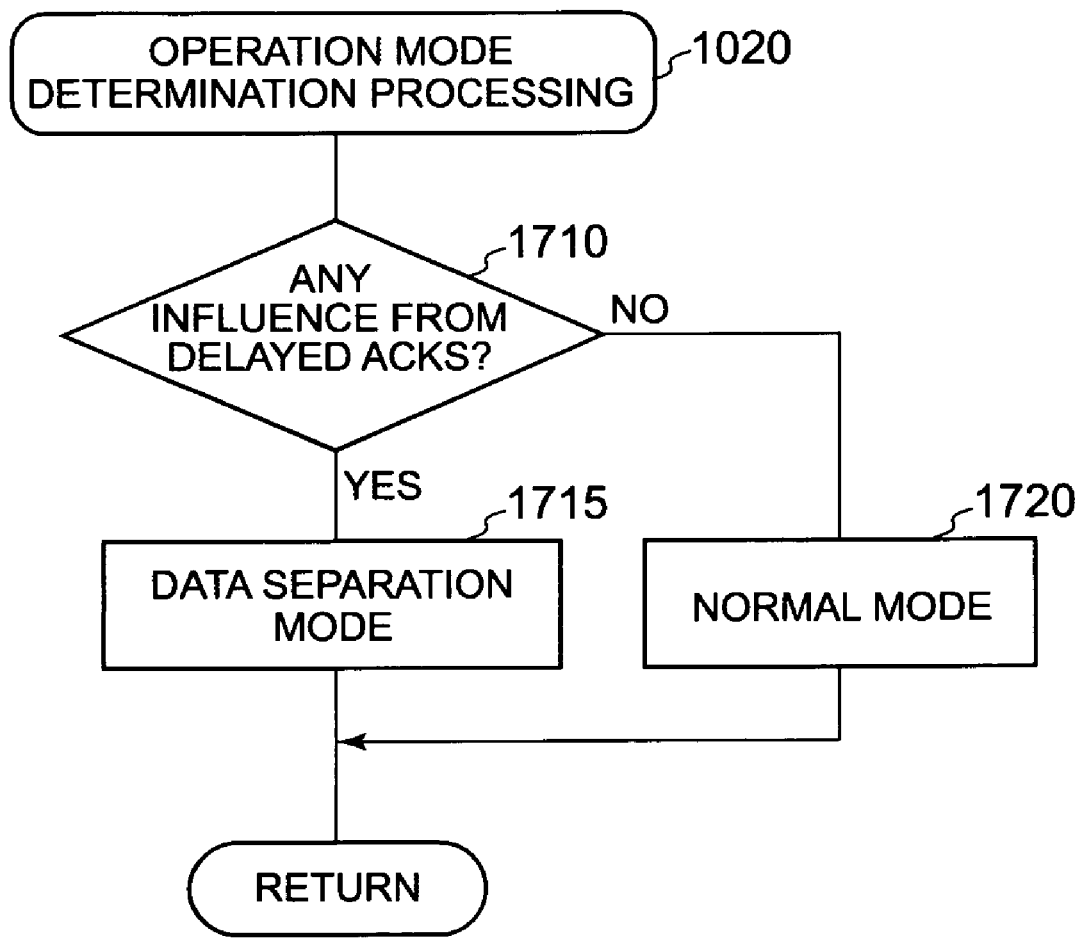
FIG. 17 shows a flow chart of operation mode determination processing in the sixth embodiment.

FIG. 17 shows a flow chart for data transmission and reception processing in this sixth embodiment.

In an initial step 1710, the CPU 125 decides whether or not the host computer which has requested to log-in is a communication partner which is subject to the influence of the Delayed ACK. In order to perform this determination, the CPU 125 refers to the applicability table 230. If the CPU 125 has decided that it is necessary to perform separation of the header and the data, in other words that this host computer is one which is subject to the influence of the Delayed ACK, and then the data separation mode is selected (step 1715). On the other hand, if the CPU 125 has decided that separation of the header and the data is not required, in other words that this host computer is not one which is subject to the influence of the Delayed ACK, and then the normal mode is selected (step 1720).

In concrete terms, if the identification information of the host computer which has requested to log-in is "iqn.2004-05.com.xyz:host1", then the separation mode is selected, since this host computer is one which is subject to the influence of the Delayed ACK. On the other hand, if the identification information of the host computer which has requested to log-in is "iqn.2004-05.com.xyz:host2", then the normal mode is selected, since communication can be performed without experiencing the influence of the Delayed ACK. During the command processing in the data separation mode and in the normal mode, the same processing may be performed as shown in FIG. 14 for the case of the first embodiment. And then the flow of control proceeds to the step 1025 of FIG. 10.

According to this sixth embodiment, the storage system decides whether or not the influence of the Delayed ACK will be experienced, based on the identification information for the host computer; and furthermore since, by separating the header and the data which are to be transmitted if the influence of the Delayed ACK will be experienced, it becomes possible to perform communication as shown in FIG. 15, accordingly it is possible to shorten the command response time without being influenced by connection environment between a host computer and a storage system and so on.

It should be understood that the present invention is not to be considered as being limited to the above described embodiments; for example, it may also be applied as described below.

(1) With the above described first through third embodiments of the present invention, when the CPU 125 decides whether or not the influence of the Delayed ACK will be experienced, it was decided whether or not the number of packets to be transmitted to the host computer 105 was an odd number; but it would also be acceptable to employ some other decision criterion. With the Delayed ACK it is made possible, until two packets are received, to delay acknowledgement thereof. If tentatively it is made possible, until a certain number of packets are received, to delay acknowledgement thereof, then, when for example the operation mode is the precedence packet mode, the step 415 of FIG. 4 may be made to be as described below. Here, the number of packets applicable to the Delayed ACK is supposed to be (D). The number of packets applicable to the Delayed ACK is supposed to be designated by the certain value.

In the step 415, when the remainder on dividing (C) by (D) is taken as being (E), if there is no remainder, then it is decided that the influence of the Delayed ACK will not be experienced, and the normal mode may be selected. If, however, a remainder does occur, then it is decided that the influence of the Delayed ACK will be experienced, and the precedence packet mode may be selected. It is possible to avoid the influence of the Delayed ACK by transmitting only the number of precedence packets ((D)-(E)), obtained by subtracting the remainder, which was calculated in the step 415 above from the number of packets applicable to the Delayed ACK.

And it will be acceptable to repeat the step 520 shown in FIG. 5 for the data transmission processing of the host I/F unit only the number of times ((D)-(E)) which was calculated just previously. It should be understood that the other operation modes (the data segmentation mode and the data separation mode) may also be provided.

(2) Although, in the above described fourth through sixth embodiments, the applicability determination for the Delayed ACK was performed at the timing of log-in by the host computer, it would also be acceptable to perform this determination at any desired timing at which it was possible to acquire the identification information for the host computer. For example, it would be acceptable to perform this determination at the timing when the host computer establishes a TCP connection with the storage system. Since, at this time, it is possible to acquire, as identification information for the host computer, at least the MAC address, the IP address, and the TCP port number, accordingly it is possible to perform the applicability determination for the Delayed ACK using any of these items of identification information.

(3) Although, in the above described embodiments, the protocol processing was performed by the I/F processing unit 119 of the host I/F unit, the manner in which this protocol processing is performed is not to be considered as being limited by this. For example, it would also be acceptable to arrange for the CPU 125 to perform the protocol processing, such as iSCSI or TCP or the like. In this case, the CPU 125 would perform generation of the iSCSI PDUs and the like, and management of the control information required for communication to be performed between the host computer 105 and the storage system 100, and state monitoring and fault processing and the like. Furthermore, the buffer 117 which is used temporarily in the process of protocol processing may consist of a portion of the memory 130.

Furthermore, the data transmission processing by the host I/F unit shown in FIG. 5 and so on may be performed by the CPU 125. Since, in this case, the CPU 125 itself performs the data processing, it is possible, not only for the host I/F unit 115 simply to transmit the packets generated by the CPU 125 to the host computer 105, but also, for example, to eliminate the step 510. Furthermore it would be acceptable, not to issue a notification of completion in the steps 525 and 555, but rather to check for completion.

(4) It would be acceptable to implement in hardware a portion of the functions which, in the above described embodiments, were implemented by programs; or, conversely, it would also be acceptable to implement by programs, a portion of the functions which were implemented in hardware. It should be understood that, provided that the storage system 100 is built so as be able to store, or to provide, the data which has been requested from the host computer 105, its structure is not to be considered as being limited to the structure shown in FIG. 1.

(5) Although in the above described embodiments it was shown, by way of example, that the various structural elements 110, 145, and 140 of the storage system 100 were connected together by the switches 135, any structure for this interconnection would be acceptable, provided that it was one which made it possible for data and control information and the like to be transferred between these various structural elements; for example, they may be connected together via a bus.

(6) Although, in the various embodiments described above, the control unit which included interfaces with the host computers 105 and the disk devices 150 was made to include the host I/F control units 110 and the disk I/F control units 145 which were separate structural units, any structure would be acceptable, provided that it provides both these types of interface within the storage system 100; for example, it would also be acceptable to arrange to provide them as a combined control unit having the functions both of the host I/F control units 110 and of the disk I/F control units 145.

(7) Although, in the various embodiments described above, it was shown by way of example that the memory 140 was divided into separate regions, i.e. the cache memory (not shown in the figures) and the shared memory (also not shown in the figures), it would also be acceptable, for example, to arrange for this matter to be managed in the memories 130 of the host I/F control units 110; any structure would be acceptable, provided that the management was performed in some location within the storage system 100.

What is claimed is:

1. A storage system which is connected to a host computer, which comprises a storage unit for storing data and communicates using a TCP protocol having a delayed acknowledgement response (Delayed ACK) to provide a deliberate delay of transmission of an acknowledgement of a received packet, comprising:

an operation mode determination unit which determines a data processing operation mode for said storage system; and a data processing unit which performs predetermined data processing according to said operation mode, wherein said operation mode determination unit determines whether or not to transmit a precedence packet that informs the host computer not to send a Delayed ACK before returning data which has been requested from said host computer, based on the length A of the data requested from said host computer, on the length B of data which can be transmitted to said host computer, and a value C obtained by dividing A by B, and being rounded up to the next integer;

wherein, if C is not a multiple of a delayed packet number of a Delayed ACK, said data processing unit transmits said precedence packet before returning said data requested from said host computer, and thereafter transmits said data to the host computer after said precedence packet is transmitted to said host computer, and wherein said precedence packet is information which can be recognized by the protocol which is used by said host computer in transmission with said storage system, and is information which does not require an acknowledgement to be transmitted for verifying that said precedence packet has been received by said host computer.

2. The storage system according to claim 1, wherein, when decided not to transmit said precedence packet, said data processing unit transmits said data requested from said host computer without transmitting said precedence packet.

3. The storage system according to claim 1, wherein said precedence packet is information which is transferred on a different layer from said data transfer.

4. A storage system which is connected to a host computer, and which comprises a storage unit for storing data and communicates using a TCP protocol having a delayed acknowledgement response (Delayed ACK) to provide a deliberate delay of transmission of an acknowledgement of a received packet, comprising:

a command analysis unit which analyzes a command transmitted from said host computer, wherein said command analysis unit acquires a length A of the data requested by said host computer from said command;

an operation mode determination unit which determines a data processing operation mode for said storage system; and a data processing unit which performs predetermined data processing according to said operation mode, wherein said operation mode determination unit, before returning data which has been requested from said host computer, decides whether or not to segment said data for transmission, based on the length A of the data requested from said host computer, on the length B of data which can be transmitted to said host computer, and a value C obtained by dividing A by B, and being rounded up to the next integer; and wherein if C is not a multiple of a delayed packet number of a Delayed ACK, said data processing unit, when said operation mode determination unit has decided to segment said data for transmission, segments and transmits said data which has been requested from said host computer, wherein said operation mode determination unit determines to segment and transmit said data, thereby avoiding the influence of Delayed ACK.

5. A storage system which is connected to a host computer, and which comprises a storage unit for storing data and communicates using a TCP protocol having a delayed acknowledgement response (Delayed ACK) to provide a deliberate delay of transmission of an acknowledgement of a received packet, comprising:

a command analysis unit which analyzes a command transmitted from said host computer, wherein said command analysis unit acquires a length A of the data requested by said host computer from said command;

an operation mode determination unit which determines a data processing operation mode for said storage system; and a data processing unit which performs predetermined data processing according to said operation mode, wherein said operation mode determination unit determines whether or not, before returning data requested by said host computer, to transmit said data by separating said data into a packet containing the header of said data and a packet containing said data, based on: the length A of the data requested from said host computer, a length of data B which can be transmitted to said host computer, and a value C obtained by dividing A by B, and being rounded up to the next integer, and if C is not a multiple of a Delayed packet number of a Delayed ACK, said data processing unit, when determined to transmit said data by separating said data into a packet containing the header of said data and a packet containing said data, separates said data which has been requested from said host computer into a packet containing the header of said data and a packet containing said data, and transmits said packets, thereby avoiding the influence of Delayed ACK, and thereafter transmits remaining data to said host computer; and wherein said separate header packet is information which can be recognized by the protocol which is used by said host computer in transmission with said storage system.

* * * * *